US008755663B2

(12) United States Patent
Makrides-Saravanos et al.

(10) Patent No.: US 8,755,663 B2
(45) Date of Patent: Jun. 17, 2014

(54) IMPACT RESISTANT FIBER OPTIC ENCLOSURES AND RELATED METHODS

(75) Inventors: Elli Makrides-Saravanos, Highland Village, TX (US); Craig Alan Strause, Springtown, TX (US); Kevin Lee Strause, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 124 days.

(21) Appl. No.: 13/282,498

(22) Filed: Oct. 27, 2011

(65) Prior Publication Data

US 2012/0106913 A1 May 3, 2012

Related U.S. Application Data

(60) Provisional application No. 61/407,739, filed on Oct. 28, 2010.

(51) Int. Cl.
*G02B 6/00* (2006.01)
*G02B 6/44* (2006.01)

(52) U.S. Cl.
CPC ............ *G02B 6/4444* (2013.01); *G02B 6/4441* (2013.01); *G02B 6/4442* (2013.01)
USPC ........................................................ 385/135

(58) Field of Classification Search
CPC ... G02B 6/4441; G02B 6/4442; G02B 6/4444
USPC ........................................................ 385/135
See application file for complete search history.

(56) References Cited

U.S. PATENT DOCUMENTS

| 2,047,152 A | 7/1936 | Mitchell |
| 2,853,775 A | 9/1958 | Drake |
| D195,338 S | 6/1963 | Geisen |
| 3,620,875 A | 11/1971 | Guglielmo, Sr. et al. |
| D225,644 S | 12/1972 | Beach et al. |

(Continued)

FOREIGN PATENT DOCUMENTS

| DE | 1430906 A1 | 9/1969 |
| DE | 7111934 U | 6/1971 |

(Continued)

OTHER PUBLICATIONS

Patent Cooperation Treaty Form ISA/210, Feb. 14, 2012, pp. 1-3.

(Continued)

*Primary Examiner* — Ryan Lepisto
(74) *Attorney, Agent, or Firm* — John H. Vynalek

(57) ABSTRACT

Impact resistant fiber optic enclosures for fiber optic components and related methods are disclosed. In one embodiment, a fiber optic enclosure is provided and comprises a housing comprising a base, a cover, and a seal disposed between the cover and the base to secure the cover to the base and define an interior cavity configured to support one or more fiber optic components. At least one expandable joint is disposed in the housing and configured to deflect and/or assist in deflecting an impact load applied to the housing. In this manner, any fiber optic components disposed in the interior cavity are protected from being damaged and/or from being exposed to the environment outside of the interior cavity. The at least one expandable joint may be disposed in at least one of the cover and the base. The at least one expandable joint may comprise two expandable joints as another example.

44 Claims, 20 Drawing Sheets

(56) References Cited

U.S. PATENT DOCUMENTS

| | | |
|---|---|---|
| 3,845,552 A | 11/1974 | Waltz |
| 3,879,575 A | 4/1975 | Dobbin et al. |
| 3,912,854 A | 10/1975 | Thompson et al. |
| 3,912,855 A | 10/1975 | Thompson et al. |
| 4,085,286 A | 4/1978 | Horsma et al. |
| 4,107,451 A | 8/1978 | Smith, Jr. et al. |
| 4,152,539 A | 5/1979 | Charlebois et al. |
| 4,213,018 A | 7/1980 | Piston |
| 4,266,853 A | 5/1981 | Hutchins et al. |
| 4,322,573 A | 3/1982 | Charlebois |
| 4,343,844 A | 8/1982 | Thayer et al. |
| 4,360,268 A | 11/1982 | Zucker et al. |
| 4,405,083 A | 9/1983 | Charlebois et al. |
| 4,413,881 A | 11/1983 | Kovats |
| 4,467,137 A | 8/1984 | Jonathan et al. |
| 4,475,935 A | 10/1984 | Tanaka et al. |
| 4,481,380 A | 11/1984 | Wood et al. |
| 4,490,315 A | 12/1984 | Charlebois et al. |
| 4,512,628 A | 4/1985 | Anderton |
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,553,812 A | 11/1985 | Kojiro et al. |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,602,840 A | 7/1986 | Romatzick |
| 4,609,773 A | 9/1986 | Brown et al. |
| 4,610,738 A | 9/1986 | Jervis |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,652,072 A | 3/1987 | Arasi, Jr. |
| 4,654,474 A | 3/1987 | Charlebois et al. |
| 4,665,279 A | 5/1987 | Ruschkofski et al. |
| 4,666,537 A | 5/1987 | Dienes |
| 4,669,802 A | 6/1987 | Schaffer |
| 4,670,069 A | 6/1987 | Debbaut et al. |
| 4,670,980 A | 6/1987 | Charlebois et al. |
| 4,673,242 A | 6/1987 | Logan et al. |
| 4,678,866 A | 7/1987 | Charlebois |
| 4,684,764 A | 8/1987 | Luzzi et al. |
| 4,685,799 A | 8/1987 | Brininstool |
| 4,701,010 A | 10/1987 | Roberts |
| 4,701,574 A | 10/1987 | Shimirak et al. |
| 4,702,551 A | 10/1987 | Coulombe |
| 4,704,499 A | 11/1987 | Faust |
| 4,708,476 A | 11/1987 | So et al. |
| 4,717,231 A | 1/1988 | Dewez et al. |
| 4,721,830 A | 1/1988 | Dagan et al. |
| 4,725,035 A | 2/1988 | Charlebois et al. |
| 4,732,628 A | 3/1988 | Dienes |
| 4,736,071 A | 4/1988 | Hawkins et al. |
| 4,742,541 A | 5/1988 | Cwirzen et al. |
| 4,747,020 A | 5/1988 | Brickley et al. |
| 4,761,052 A | 8/1988 | Buekers et al. |
| 4,764,232 A | 8/1988 | Hunter |
| 4,785,376 A | 11/1988 | Dively |
| 4,792,203 A | 12/1988 | Nelson et al. |
| 4,805,979 A | 2/1989 | Bossard et al. |
| 4,818,824 A | 4/1989 | Dixit et al. |
| 4,822,434 A | 4/1989 | Sawaki et al. |
| 4,834,479 A | 5/1989 | Adl |
| 4,850,014 A | 7/1989 | Gillis et al. |
| 4,859,809 A | 8/1989 | Jervis |
| 4,867,524 A | 9/1989 | Courtney et al. |
| 4,875,952 A | 10/1989 | Mullin et al. |
| 4,882,647 A | 11/1989 | Collins |
| 4,884,863 A | 12/1989 | Throckmorton |
| 4,913,512 A | 4/1990 | Anderton |
| 4,917,615 A | 4/1990 | Franks, Jr. |
| 4,927,227 A | 5/1990 | Bensel, III et al. |
| 4,932,742 A | 6/1990 | Tohme |
| 4,952,798 A | 8/1990 | Graham et al. |
| 4,958,900 A | 9/1990 | Ortiz, Jr. |
| 4,960,317 A | 10/1990 | Briggs et al. |
| 4,961,623 A | 10/1990 | Midkiff et al. |
| 4,963,698 A | 10/1990 | Chang et al. |
| 4,982,083 A | 1/1991 | Graham et al. |
| 4,986,762 A | 1/1991 | Keith |
| D314,759 S | 2/1991 | Collins et al. |
| 4,989,939 A | 2/1991 | Cox et al. |
| 4,995,688 A | 2/1991 | Anton et al. |
| 5,004,315 A | 4/1991 | Miyazaki |
| 5,011,256 A | 4/1991 | Johnson et al. |
| D318,653 S | 7/1991 | Nieves et al. |
| 5,029,958 A | 7/1991 | Hodge et al. |
| 5,031,984 A | 7/1991 | Eide et al. |
| 5,042,901 A | 8/1991 | Merriken et al. |
| 5,046,811 A | 9/1991 | Jung et al. |
| 5,050,949 A | 9/1991 | DiGiovanni et al. |
| 5,052,773 A | 10/1991 | Noon et al. |
| 5,052,775 A | 10/1991 | Bossard et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,076,688 A | 12/1991 | Bowen et al. |
| 5,077,815 A | 12/1991 | Yoshizawa et al. |
| 5,091,987 A | 2/1992 | MacCulloch et al. |
| 5,093,885 A | 3/1992 | Anton |
| 5,097,529 A | 3/1992 | Cobb et al. |
| 5,099,088 A | 3/1992 | Usami et al. |
| 5,100,221 A | 3/1992 | Carney et al. |
| 5,109,458 A | 4/1992 | Dixit et al. |
| 5,115,105 A | 5/1992 | Gallusser et al. |
| 5,121,458 A | 6/1992 | Nilsson et al. |
| 5,122,069 A | 6/1992 | Brownlie et al. |
| 5,125,060 A | 6/1992 | Edmundson |
| 5,127,082 A | 6/1992 | Below et al. |
| 5,129,030 A | 7/1992 | Petrunia |
| 5,133,038 A | 7/1992 | Zipper |
| 5,133,039 A | 7/1992 | Dixit |
| 5,142,606 A | 8/1992 | Carney et al. |
| 5,155,303 A | 10/1992 | Bensel, III et al. |
| 5,179,618 A | 1/1993 | Anton |
| 5,185,844 A | 2/1993 | Bensel, III et al. |
| 5,185,845 A | 2/1993 | Jones |
| 5,194,692 A | 3/1993 | Gallusser et al. |
| 5,204,929 A | 4/1993 | Machall et al. |
| 5,209,958 A | 5/1993 | Katsaros et al. |
| 5,210,812 A | 5/1993 | Nilsson et al. |
| 5,212,761 A | 5/1993 | Petrunia |
| 5,214,735 A | 5/1993 | Henneberger et al. |
| 5,217,808 A | 6/1993 | Cobb |
| 5,224,187 A | 6/1993 | Davisdon |
| D337,313 S | 7/1993 | Davis |
| 5,231,687 A | 7/1993 | Handley |
| 5,235,665 A | 8/1993 | Marchesi et al. |
| 5,241,611 A | 8/1993 | Gould |
| 5,245,151 A | 9/1993 | Chamberlain et al. |
| 5,247,135 A | 9/1993 | Rebers et al. |
| 5,259,047 A | 11/1993 | Morrison et al. |
| 5,260,957 A | 11/1993 | Hakimi et al. |
| 5,267,122 A | 11/1993 | Glover et al. |
| 5,308,954 A | 5/1994 | Manock et al. |
| 5,322,973 A | 6/1994 | Dagan |
| 5,335,408 A | 8/1994 | Cobb |
| 5,347,089 A | 9/1994 | Barrat et al. |
| 5,353,367 A | 10/1994 | Czosnowski et al. |
| 5,357,565 A | 10/1994 | Butler, III et al. |
| 5,363,465 A | 11/1994 | Korkowski et al. |
| 5,363,467 A | 11/1994 | Keith |
| 5,367,598 A | 11/1994 | Devenish, III et al. |
| 5,376,196 A | 12/1994 | Grajewski et al. |
| 5,378,853 A | 1/1995 | Clouet et al. |
| 5,381,501 A | 1/1995 | Cardinal et al. |
| 5,386,490 A | 1/1995 | Pan et al. |
| 5,394,502 A | 2/1995 | Caron |

(56) References Cited

U.S. PATENT DOCUMENTS

| | | |
|---|---|---|
| 5,402,515 A | 3/1995 | Vidacovich et al. |
| 5,410,105 A | 4/1995 | Tahara et al. |
| RE34,955 E | 5/1995 | Anton et al. |
| 5,418,874 A | 5/1995 | Carlisle et al. |
| 5,420,958 A | 5/1995 | Henson et al. |
| 5,425,121 A | 6/1995 | Cooke et al. |
| RE34,995 E | 7/1995 | Domenig |
| 5,432,875 A | 7/1995 | Korkowski et al. |
| 5,440,655 A | 8/1995 | Kaplow et al. |
| 5,440,665 A | 8/1995 | Ray et al. |
| 5,442,726 A | 8/1995 | Howard et al. |
| 5,446,822 A | 8/1995 | Keith |
| 5,446,823 A | 8/1995 | Bingham et al. |
| 5,450,517 A | 9/1995 | Essert |
| 5,450,518 A | 9/1995 | Burek et al. |
| 5,475,781 A | 12/1995 | Chang et al. |
| 5,481,639 A | 1/1996 | Cobb et al. |
| 5,491,766 A | 2/1996 | Huynh et al. |
| 5,495,549 A | 2/1996 | Schneider et al. |
| 5,509,099 A | 4/1996 | Hermsen et al. |
| 5,509,202 A | 4/1996 | Abdow |
| 5,517,592 A | 5/1996 | Grajewski et al. |
| 5,525,756 A | 6/1996 | Mullaney et al. |
| 5,528,718 A | 6/1996 | Ray et al. |
| 5,553,186 A | 9/1996 | Allen |
| D377,339 S | 1/1997 | Beruscha et al. |
| 5,598,499 A | 1/1997 | Burek et al. |
| 5,623,542 A | 4/1997 | Schneider et al. |
| 5,633,973 A | 5/1997 | Vincent et al. |
| 5,638,481 A | 6/1997 | Arnett |
| 5,640,482 A | 6/1997 | Barry et al. |
| 5,644,671 A | 7/1997 | Goetter et al. |
| 5,645,449 A | 7/1997 | Sabo |
| 5,657,413 A | 8/1997 | Ray et al. |
| 5,659,650 A | 8/1997 | Arnett |
| 5,666,453 A | 9/1997 | Dannenmann |
| 5,684,911 A | 11/1997 | Burgett |
| 5,689,607 A | 11/1997 | Vincent et al. |
| 5,696,864 A | 12/1997 | Smith et al. |
| 5,701,380 A | 12/1997 | Larson et al. |
| 5,708,742 A | 1/1998 | Beun et al. |
| 5,708,753 A | 1/1998 | Frigo et al. |
| 5,732,180 A | 3/1998 | Kaplan |
| 5,734,776 A | 3/1998 | Puetz |
| 5,741,158 A | 4/1998 | Reed et al. |
| 5,745,633 A | 4/1998 | Giebel et al. |
| 5,754,724 A | 5/1998 | Peterson et al. |
| 5,757,997 A | 5/1998 | Birrell et al. |
| 5,758,003 A | 5/1998 | Wheeler et al. |
| 5,767,448 A | 6/1998 | Dong |
| 5,778,122 A | 7/1998 | Giebel et al. |
| 5,781,678 A | 7/1998 | Sano et al. |
| D399,190 S | 10/1998 | Dale et al. |
| 5,823,646 A | 10/1998 | Arizpe et al. |
| 5,825,963 A | 10/1998 | Burgett |
| 5,825,964 A | 10/1998 | Goetter et al. |
| 5,828,807 A | 10/1998 | Tucker et al. |
| D401,568 S | 11/1998 | Alden et al. |
| 5,861,575 A | 1/1999 | Broussard |
| 5,867,621 A | 2/1999 | Luther et al. |
| 5,881,200 A | 3/1999 | Burt |
| 5,892,870 A | 4/1999 | Fingler et al. |
| 5,894,540 A | 4/1999 | Drewing |
| 5,896,486 A | 4/1999 | Burek et al. |
| 5,898,813 A | 4/1999 | Beier |
| 5,903,698 A | 5/1999 | Poremba et al. |
| 5,907,653 A | 5/1999 | Burek et al. |
| 5,914,846 A | 6/1999 | Smith et al. |
| 5,917,648 A | 6/1999 | Harker |
| 5,937,121 A | 8/1999 | Ott et al. |
| 5,945,633 A | 8/1999 | Ott et al. |
| 5,946,440 A | 8/1999 | Puetz |
| 5,956,449 A | 9/1999 | Otani et al. |
| 5,957,415 A | 9/1999 | Perea ........................ 248/58 |
| D415,118 S | 10/1999 | Stanush et al. |
| 5,969,294 A | 10/1999 | Eberle et al. |
| 5,975,769 A | 11/1999 | Larson et al. |
| 5,987,203 A | 11/1999 | Abel et al. |
| 5,997,186 A | 12/1999 | Huynh et al. |
| RE36,592 E | 2/2000 | Giebel et al. |
| 6,037,544 A | 3/2000 | Lee et al. |
| D422,564 S | 4/2000 | Arizpe |
| 6,049,413 A | 4/2000 | Taylor et al. |
| 6,053,054 A | 4/2000 | Wusterbarth et al. |
| D424,598 S | 5/2000 | Simioni |
| 6,061,492 A | 5/2000 | Strause et al. |
| 6,061,870 A | 5/2000 | Dodge et al. |
| 6,064,791 A | 5/2000 | Crawford et al. |
| 6,086,263 A | 7/2000 | Selli et al. |
| 6,104,846 A | 8/2000 | Hodgson et al. |
| 6,122,420 A | 9/2000 | Satoh |
| RE36,952 E | 11/2000 | Zagar et al. |
| 6,151,436 A * | 11/2000 | Burek et al. .................. 385/135 |
| 6,160,946 A | 12/2000 | Thompson et al. |
| 6,167,183 A | 12/2000 | Swain |
| RE37,028 E | 1/2001 | Cooke et al. |
| 6,184,470 B1 | 2/2001 | Froehlich et al. |
| 6,195,494 B1 | 2/2001 | Abbott et al. |
| 6,198,866 B1 | 3/2001 | Nikolaevich |
| 6,206,583 B1 | 3/2001 | Hishikawa et al. |
| 6,208,796 B1 | 3/2001 | Williams Vigliaturo |
| 6,215,930 B1 | 4/2001 | Estes et al. |
| 6,215,939 B1 | 4/2001 | Cloud |
| 6,218,620 B1 | 4/2001 | Michel |
| 6,255,584 B1 | 7/2001 | Renaud |
| 6,259,024 B1 | 7/2001 | Daoud |
| 6,259,851 B1 | 7/2001 | Daoud |
| 6,263,141 B1 | 7/2001 | Smith |
| 6,275,641 B1 | 8/2001 | Daoud |
| 6,278,829 B1 | 8/2001 | Buabbud et al. |
| 6,292,614 B1 | 9/2001 | Smith et al. |
| D449,824 S | 10/2001 | Higa et al. |
| 6,300,562 B1 | 10/2001 | Daoud |
| 6,343,950 B1 | 2/2002 | Eginton et al. |
| 6,353,186 B1 | 3/2002 | Dams et al. |
| 6,353,697 B1 | 3/2002 | Daoud |
| 6,359,228 B1 | 3/2002 | Strause et al. |
| 6,363,200 B1 | 3/2002 | Thompson et al. |
| 6,369,883 B1 | 4/2002 | Clark |
| 6,376,774 B1 | 4/2002 | Oh et al. |
| 6,389,213 B1 | 5/2002 | Quesnel |
| 6,389,214 B1 | 5/2002 | Smith et al. |
| 6,407,338 B1 | 6/2002 | Smith |
| 6,417,453 B1 | 7/2002 | Lapp et al. |
| 6,418,262 B1 | 7/2002 | Puetz et al. |
| 6,418,266 B1 | 7/2002 | Vitantonio |
| 6,424,781 B1 | 7/2002 | Puetz et al. |
| 6,427,035 B1 | 7/2002 | Mahony |
| 6,435,727 B1 | 8/2002 | Fingler et al. |
| 6,438,310 B1 | 8/2002 | Lance et al. |
| 6,439,777 B1 | 8/2002 | Harrison et al. |
| 6,439,779 B1 | 8/2002 | Hafer |
| 6,441,944 B1 | 8/2002 | Kim et al. |
| 6,453,106 B1 | 9/2002 | Glaser et al. |
| 6,454,464 B1 | 9/2002 | Nolan |
| 6,466,725 B2 | 10/2002 | Battey et al. |
| 6,487,336 B1 | 11/2002 | Yao |
| 6,493,500 B1 | 12/2002 | Oh et al. |
| 6,508,593 B1 | 1/2003 | Farnsworth et al. |
| 6,533,472 B1 | 3/2003 | Dinh et al. |
| 6,535,579 B1 | 3/2003 | Blake et al. |
| 6,535,682 B1 | 3/2003 | Puetz et al. |
| 6,539,160 B2 | 3/2003 | Battey et al. |
| 6,542,688 B1 | 4/2003 | Battey et al. |
| 6,556,763 B1 | 4/2003 | Puetz et al. |
| 6,565,261 B1 | 5/2003 | Uchiyama et al. |
| 6,577,801 B2 | 6/2003 | Broderick et al. |
| 6,582,132 B1 | 6/2003 | Farnsworth et al. |
| 6,583,867 B1 | 6/2003 | Jennings et al. |
| 6,589,014 B1 | 7/2003 | Hawryluk et al. |
| 6,612,515 B1 | 9/2003 | Tinucci et al. |
| 6,614,665 B2 | 9/2003 | Witty et al. |
| 6,619,697 B2 | 9/2003 | Griffioen et al. |
| 6,628,870 B2 | 9/2003 | Yamaguchi |

(56) References Cited

U.S. PATENT DOCUMENTS

| | | |
|---|---|---|
| 6,631,237 B2 | 10/2003 | Knudsen et al. |
| D482,667 S | 11/2003 | Yu |
| 6,648,520 B2 | 11/2003 | McDonald et al. |
| 6,650,458 B1 | 11/2003 | Prosyk et al. |
| 6,652,295 B1 | 11/2003 | Glass et al. |
| 6,655,016 B2 | 12/2003 | Renaud |
| 6,661,961 B1 | 12/2003 | Allen et al. |
| 6,668,127 B1 | 12/2003 | Mahony |
| 6,678,457 B2 | 1/2004 | Kim et al. |
| 6,706,968 B2 | 3/2004 | Yaworski et al. |
| 6,710,366 B1 | 3/2004 | Lee et al. |
| 6,711,337 B2 | 3/2004 | Hodge et al. |
| 6,711,340 B2 | 3/2004 | Dickson |
| 6,721,484 B1 | 4/2004 | Blankenship et al. |
| 6,721,507 B2 | 4/2004 | Iwata et al. |
| 6,744,962 B2 | 6/2004 | Allerellie |
| 6,757,308 B2 | 6/2004 | Eldring et al. |
| 6,760,531 B1 | 7/2004 | Solheid et al. |
| 6,764,220 B2 | 7/2004 | Griffiths et al. |
| 6,766,094 B2 | 7/2004 | Smith et al. |
| 6,775,456 B2 | 8/2004 | Matsuura |
| 6,778,752 B2 | 8/2004 | Laporte et al. |
| 6,782,209 B2 | 8/2004 | Copeland et al. |
| 6,786,652 B2 | 9/2004 | Marquez et al. |
| 6,792,191 B1 | 9/2004 | Clapp, Jr. et al. |
| 6,795,182 B2 | 9/2004 | Rakuljic et al. |
| 6,795,552 B1 | 9/2004 | Stanush et al. |
| 6,802,512 B2 | 10/2004 | Muller et al. |
| 6,804,352 B2 | 10/2004 | Miller et al. |
| 6,810,194 B2 | 10/2004 | Griffiths et al. |
| 6,815,612 B2 | 11/2004 | Bloodworth et al. |
| 6,819,842 B1 | 11/2004 | Vogel et al. |
| 6,824,312 B2 | 11/2004 | McClellan et al. |
| 6,856,747 B2 | 2/2005 | Cloud et al. |
| 6,856,748 B1 | 2/2005 | Elkins, II et al. |
| 6,861,584 B2 | 3/2005 | Hutchin et al. |
| 6,863,446 B2 | 3/2005 | Ngo |
| 6,866,541 B2 | 3/2005 | Barker et al. |
| 6,873,868 B2 | 3/2005 | Furnish |
| 6,875,926 B2 | 4/2005 | Buekers et al. |
| 6,880,219 B2 | 4/2005 | Griffioen et al. |
| 6,880,986 B2 | 4/2005 | Mynatt et al. |
| 6,901,200 B2 | 5/2005 | Schray |
| 6,916,199 B2 | 7/2005 | Follingstad |
| 6,918,786 B2 | 7/2005 | Barker et al. |
| 6,920,274 B2 | 7/2005 | Rapp et al. |
| 6,926,449 B1 | 8/2005 | Keenum et al. |
| 6,934,433 B2 | 8/2005 | Miyata et al. |
| 6,940,018 B1 | 9/2005 | Dewhirst |
| 6,968,107 B2 | 11/2005 | Belardi et al. |
| D512,697 S | 12/2005 | Enns et al. |
| 6,980,725 B1 | 12/2005 | Swieconek |
| 6,981,893 B2 | 1/2006 | Barker et al. |
| 6,983,095 B2 | 1/2006 | Reagan et al. |
| 7,006,739 B2 | 2/2006 | Elkins, II et al. |
| 7,013,074 B2 | 3/2006 | Battey et al. |
| 7,016,592 B2 | 3/2006 | Elkins, II et al. |
| 7,054,513 B2 | 5/2006 | Herz et al. |
| 7,088,899 B2 | 8/2006 | Reagan et al. |
| 7,094,095 B1 | 8/2006 | Caveney |
| 7,103,255 B2 | 9/2006 | Reagan et al. |
| 7,113,686 B2 | 9/2006 | Bellekens et al. |
| 7,120,347 B2 | 10/2006 | Blackwell, Jr. et al. |
| 7,139,461 B2 | 11/2006 | Puetz et al. |
| 7,142,763 B2 | 11/2006 | Frohlich et al. |
| 7,142,764 B2 | 11/2006 | Allen et al. |
| 7,149,398 B2 | 12/2006 | Solheid et al. |
| 7,171,100 B2 | 1/2007 | Solheid et al. |
| 7,179,119 B2 | 2/2007 | Follingstad |
| 7,190,874 B1 | 3/2007 | Barth et al. |
| 7,200,317 B2 | 4/2007 | Reagan et al. |
| D543,513 S | 5/2007 | Allen et al. |
| 7,218,827 B2 | 5/2007 | Vongseng et al. |
| 7,218,828 B2 | 5/2007 | Feustel et al. |
| 7,220,145 B2 | 5/2007 | Denovich et al. |
| 7,221,832 B2 | 5/2007 | Tinucci |
| 7,239,789 B2 | 7/2007 | Grubish et al. |
| 7,244,144 B2 | 7/2007 | Follingstad |
| 7,257,223 B2 | 8/2007 | Sajadi et al. |
| 7,260,301 B2 | 8/2007 | Barth et al. |
| 7,274,850 B2 | 9/2007 | Wittmeier et al. |
| 7,277,620 B2 | 10/2007 | Vongseng et al. |
| D556,145 S | 11/2007 | Williams et al. |
| 7,292,763 B2 | 11/2007 | Smith et al. |
| 7,302,152 B2 | 11/2007 | Luther et al. |
| D560,170 S | 1/2008 | Ni |
| 7,327,926 B2 | 2/2008 | Barth et al. |
| 7,330,625 B2 | 2/2008 | Barth |
| 7,333,706 B2 | 2/2008 | Parikh et al. |
| 7,333,707 B2 | 2/2008 | Puetz et al. |
| 7,333,708 B2 | 2/2008 | Blackwell, Jr. et al. |
| 7,343,078 B2 | 3/2008 | Spisany et al. |
| 7,349,616 B1 | 3/2008 | Castonguay et al. |
| 7,351,909 B1 | 4/2008 | Harwood et al. |
| 7,362,925 B2 | 4/2008 | Miyata et al. |
| 7,397,997 B2 | 7/2008 | Ferris et al. |
| 7,400,816 B2 | 7/2008 | Reagan et al. |
| 7,433,566 B2 | 10/2008 | Bookbinder et al. |
| 7,450,807 B2 | 11/2008 | Bickham et al. |
| 7,489,849 B2 | 2/2009 | Reagan et al. |
| 7,499,622 B2 | 3/2009 | Castonguay et al. |
| 7,505,660 B2 | 3/2009 | Bickham et al. |
| D597,403 S | 8/2009 | Ho et al. |
| 7,668,431 B2 | 2/2010 | Cox et al. |
| 7,702,208 B2 | 4/2010 | Mudd et al. |
| 7,751,675 B2 | 7/2010 | Holmberg et al. |
| 8,020,259 B2 | 9/2011 | Ho et al. |
| 8,107,785 B2 | 1/2012 | Berglund et al. |
| 2001/0052451 A1 | 12/2001 | Ruoss et al. |
| 2002/0051616 A1 | 5/2002 | Battey et al. |
| 2002/0061170 A1 | 5/2002 | Wu et al. |
| 2002/0079697 A1 | 6/2002 | Griffioen et al. |
| 2002/0146229 A1 | 10/2002 | Roberts |
| 2002/0181925 A1 | 12/2002 | Hodge et al. |
| 2003/0010519 A1 | 1/2003 | Pieck |
| 2003/0063869 A1 | 4/2003 | Elkins, II et al. |
| 2003/0077041 A1 | 4/2003 | Belaidi et al. |
| 2003/0103750 A1 | 6/2003 | Laporte et al. |
| 2003/0123838 A1 | 7/2003 | Wang et al. |
| 2003/0125719 A1 | 7/2003 | Furnish |
| 2003/0147597 A1 | 8/2003 | Duran |
| 2003/0223725 A1 | 12/2003 | Laporte et al. |
| 2004/0062508 A1 | 4/2004 | Blankenship et al. |
| 2004/0074852 A1 | 4/2004 | Knudsen et al. |
| 2004/0123998 A1 | 7/2004 | Berglund et al. |
| 2004/0126069 A1 | 7/2004 | Jong et al. |
| 2004/0146266 A1 | 7/2004 | Solheid et al. |
| 2004/0161217 A1 | 8/2004 | Hodge et al. |
| 2004/0211774 A1 | 10/2004 | Daoud et al. |
| 2004/0213620 A1 | 10/2004 | Bergeron et al. |
| 2004/0228589 A1 | 11/2004 | Melton et al. |
| 2004/0228598 A1 | 11/2004 | Allen et al. |
| 2004/0247265 A1 | 12/2004 | Takano et al. |
| 2004/0256138 A1 | 12/2004 | Grubish et al. |
| 2005/0002633 A1 | 1/2005 | Solheid et al. |
| 2005/0021392 A1 | 1/2005 | English et al. |
| 2005/0025444 A1 | 2/2005 | Barnes et al. |
| 2005/0053337 A1 | 3/2005 | Mayer |
| 2005/0053342 A1 | 3/2005 | Melton et al. |
| 2005/0069275 A1 | 3/2005 | Brants et al. |
| 2005/0094959 A1 | 5/2005 | Sibley et al. |
| 2005/0100301 A1 | 5/2005 | Solheid et al. |
| 2005/0105873 A1 | 5/2005 | Reagan et al. |
| 2005/0111799 A1 | 5/2005 | Cooke et al. |
| 2005/0129375 A1 | 6/2005 | Elkins, II et al. |
| 2005/0129379 A1 | 6/2005 | Reagan et al. |
| 2005/0135768 A1 | 6/2005 | Rapp et al. |
| 2005/0145522 A1 | 7/2005 | Bloodworth et al. |
| 2005/0163448 A1 | 7/2005 | Blackwell, Jr. et al. |
| 2005/0175307 A1* | 8/2005 | Battey et al. .................. 385/135 |
| 2005/0175308 A1 | 8/2005 | Elkins, II et al. |
| 2005/0185895 A1 | 8/2005 | Keenum et al. |
| 2005/0213921 A1 | 9/2005 | Mertesdorf et al. |
| 2005/0220421 A1 | 10/2005 | Keenum et al. |

(56) References Cited

U.S. PATENT DOCUMENTS

| | | |
|---|---|---|
| 2005/0259928 A1 | 11/2005 | Elkins, II et al. |
| 2005/0259929 A1 | 11/2005 | Elkins, II et al. |
| 2005/0271344 A1 | 12/2005 | Grubish et al. |
| 2005/0276552 A1 | 12/2005 | Cooke et al. |
| 2005/0281526 A1 | 12/2005 | Vongseng et al. |
| 2006/0008231 A1 | 1/2006 | Reagan et al. |
| 2006/0029353 A1 | 2/2006 | Bolster et al. |
| 2006/0056782 A1 | 3/2006 | Elkins, II et al. |
| 2006/0093302 A1 | 5/2006 | Solheid et al. |
| 2006/0093303 A1 | 5/2006 | Reagan et al. |
| 2006/0153517 A1 | 7/2006 | Reagan et al. |
| 2006/0165366 A1 | 7/2006 | Feustel et al. |
| 2006/0193588 A1 | 8/2006 | Mertesdorf et al. |
| 2006/0222309 A1 | 10/2006 | Grubish et al. |
| 2006/0233506 A1 | 10/2006 | Noonan et al. |
| 2006/0263029 A1 | 11/2006 | Mudd et al. |
| 2007/0031100 A1 | 2/2007 | Garcia et al. |
| 2007/0036488 A1 | 2/2007 | Harrison et al. |
| 2007/0116413 A1 | 5/2007 | Cox .................... 385/57 |
| 2007/0140642 A1 | 6/2007 | Mertesdorf et al. |
| 2007/0165995 A1 | 7/2007 | Reagan et al. |
| 2007/0192817 A1 | 8/2007 | Landry et al. |
| 2007/0237484 A1 | 10/2007 | Reagan et al. |
| 2008/0056654 A1 | 3/2008 | Bickham et al. |
| 2008/0069511 A1 | 3/2008 | Blackwell, Jr. et al. |
| 2008/0075411 A1 | 3/2008 | Solheid et al. |
| 2008/0166094 A1 | 7/2008 | Bookbinder et al. |
| 2008/0253730 A1 | 10/2008 | Cox et al. |
| 2010/0092146 A1 | 4/2010 | Conner et al. |
| 2011/0042529 A1 | 2/2011 | Walter |
| 2011/0097050 A1 | 4/2011 | Blackwell, Jr. et al. |
| 2013/0028568 A1 | 1/2013 | Beamon et al. |
| 2013/0043069 A1 | 2/2013 | Okuyama |
| 2013/0233597 A1 | 9/2013 | Suiter |

FOREIGN PATENT DOCUMENTS

| | | |
|---|---|---|
| DE | 3537684 A1 | 4/1987 |
| DE | 3900021 A1 | 10/1990 |
| EP | 0110673 A1 | 6/1984 |
| EP | 0124987 A2 | 11/1984 |
| EP | 0251396 A1 | 1/1988 |
| EP | 0320189 A2 | 6/1989 |
| EP | 0320236 A2 | 6/1989 |
| EP | 0511147 A1 | 10/1992 |
| EP | 0512811 A1 | 11/1992 |
| EP | 0514174 A1 | 11/1992 |
| EP | 0620462 A1 | 10/1994 |
| EP | 0646294 A1 | 4/1995 |
| EP | 0805536 A1 | 11/1997 |
| EP | 0844504 A2 | 5/1998 |
| EP | 0851257 A1 | 7/1998 |
| EP | 0903604 A2 | 3/1999 |
| EP | 1138828 A2 | 10/2001 |
| EP | 1361465 A1 | 11/2003 |
| EP | 1380828 A1 | 1/2004 |
| EP | 1012642 B1 | 12/2007 |
| FR | 2667955 A1 | 4/1992 |
| FR | 2780209 A1 | 12/1999 |
| FR | 2853775 A1 | 10/2004 |
| GB | 1324177 A | 7/1973 |
| GB | 2087170 A | 5/1982 |
| GB | 2248729 A | 4/1992 |
| JP | 58105114 A | 6/1983 |
| JP | 60169813 A | 9/1985 |
| JP | 60169815 A | 9/1985 |
| JP | 612603 | 1/1986 |
| JP | 61220536 A | 9/1986 |
| JP | 6254204 | 3/1987 |
| JP | 6259906 | 3/1987 |
| JP | 62181903 U | 11/1987 |
| JP | 62191908 U | 12/1987 |
| JP | 63130317 | 6/1988 |
| JP | 63136007 | 6/1988 |
| JP | 63180915 | 7/1988 |
| JP | 63200105 | 8/1988 |
| JP | 63257701 | 10/1988 |
| JP | 63287916 | 11/1988 |
| JP | 63188607 | 12/1988 |
| JP | 1138828 A | 5/1989 |
| JP | 1177709 A | 7/1989 |
| JP | 1182802 A | 7/1989 |
| JP | 1225240 A | 9/1989 |
| JP | 1265211 A | 10/1989 |
| JP | 4309906 | 2/1992 |
| JP | 584902 | 11/1993 |
| JP | 6027510 A | 2/1994 |
| JP | 619387 | 3/1994 |
| JP | 6127510 A | 5/1994 |
| JP | 6181861 | 7/1994 |
| JP | 6227312 A | 8/1994 |
| JP | 6337317 | 12/1994 |
| JP | 8114724 | 5/1996 |
| JP | 915426 | 1/1997 |
| JP | 10133033 A | 5/1998 |
| JP | 11508760 | 7/1999 |
| JP | 2000241631 A | 9/2000 |
| JP | 2002207127 A | 7/2002 |
| JP | 2002-233028 A | 8/2002 |
| JP | 2003057512 | 2/2003 |
| JP | 2003177254 A | 6/2003 |
| JP | 2005338436 A | 12/2005 |
| WO | 9105281 A1 | 4/1991 |
| WO | 9110927 A1 | 7/1991 |
| WO | 9326069 A1 | 12/1993 |
| WO | 9507478 A1 | 3/1995 |
| WO | 9523449 A1 | 8/1995 |
| WO | 0206879 A1 | 1/2002 |
| WO | 02093215 A2 | 11/2002 |
| WO | 2004086112 A1 | 10/2004 |
| WO | 2004095107 A1 | 11/2004 |
| WO | 2005008307 A2 | 1/2005 |
| WO | 2005050277 A2 | 6/2005 |
| WO | 2005088373 A1 | 9/2005 |
| WO | 2005119322 A1 | 12/2005 |
| WO | 2006044080 A1 | 4/2006 |
| WO | 2006050505 A1 | 5/2006 |
| WO | 2006052355 A1 | 5/2006 |
| WO | 2006076120 A1 | 7/2006 |
| WO | 2006135524 A2 | 12/2006 |
| WO | 2008118603 A2 | 10/2008 |
| WO | 2009076536 A1 | 6/2009 |
| WO | 2009089327 A2 | 7/2009 |

OTHER PUBLICATIONS

Non-final Office Action for U.S. Appl. No. 11/285,130 mailed Jun. 20, 2006, 8 pages.

Final Office Action for U.S. Appl. No. 11/285,130 mailed Feb. 9, 2007, 10 pages.

Non-final Office Action for U.S. Appl. No. 11/285,130 mailed Oct. 4, 2007, 9 pages.

Final Office Action for U.S. Appl. No. 11/285,130 mailed Jul. 9, 2008, 11 pages.

Advisory Action for U.S. Appl. No. 11/285,130 mailed Oct. 6, 2008, 3 pages.

Non-final Office Action for U.S. Appl. No. 11/285,130 mailed Jan. 23, 2009, 10 pages.

Final Office Action for U.S. Appl. No. 11/285,130 mailed Jul. 22, 2009, 11 pages.

Notice of Allowance for U.S. Appl. No. 11/285,130 mailed Mar. 9, 2010, 7 pages.

Supplemental Notice of Allowance for U.S. Appl. No. 11/285,130 mailed May 27, 2010, 4 pages.

Non-final Office Action for U.S. Appl. No. 11/432,570 mailed Apr. 10, 2007, 29 pages.

Non-final Office Action for U.S. Appl. No. 11/432,570 mailed Nov. 1, 2007, 23 pages.

Non-final Office Action for U.S. Appl. No. 11/432,570 mailed Aug. 19, 2008, 9 pages.

(56) References Cited

OTHER PUBLICATIONS

Notice of Allowance for U.S. Appl. No. 11/432,570 mailed Apr. 16, 2009, 8 pages.
Notice of Allowance for U.S. Appl. No. 11/432,570 mailed Oct. 30, 2009, 4 pages.
Non-final Office Action for U.S. Appl. No. 11/439,088 mailed Sep. 2, 2008, 14 pages.
Notice of Allowance for U.S. Appl. No. 11/439,088 mailed Feb. 18, 2009, 8 pages.
Non-final Office Action for U.S. Appl. No. 11/804,452 mailed Nov. 13, 2008, 10 pages.
Notice of Allowance for U.S. Appl. No. 11/804,452 mailed Oct. 6, 2009, 8 pages.
Non-final Office Action for U.S. Appl. No. 11/881,518 mailed Mar. 10, 2009, 7 pages.
Notice of Allowance for U.S. Appl. No. 11/881,518 mailed Sep. 3, 2009, 8 pages.
Non-final Office Action for U.S. Appl. No. 11/901,800 mailed Mar. 13, 2009, 8 pages.
Notice of Allowance for U.S. Appl. No. 11/901,800 mailed Sep. 25, 2009, 7 pages.
Notice of Allowance for U.S. Appl. No. 11/901,800 mailed Jan. 26, 2010, 8 pages.
Non-final Office Action for U.S. Appl. No. 12/069,639 mailed Jul. 3, 2008, 10 pages.
Final Office Action for U.S. Appl. No. 12/069,639 mailed Jan. 28, 2009, 12 pages.
Non-final Office Action for U.S. Appl. No. 12/069,639 mailed Jun. 25, 2009, 10 pages.
Non-final Office Action for U.S. Appl. No. 12/082,330 mailed Jul. 25, 2008, 8 pages.
Non-final Office Action for U.S. Appl. No. 12/082,330 mailed Jan. 8, 2009, 9 pages.
Notice of Allowance for U.S. Appl. No. 12/082,330 mailed Oct. 1, 2009, 6 pages.
Non-final Office Action for U.S. Appl. No. 12/323,373 mailed Feb. 3, 2010, 6 pages.
Final Office Action for U.S. Appl. No. 12/323,373 mailed Aug. 6, 2010, 7 pages.
Advisory Action for U.S. Appl. No. 12/323,373 mailed Oct. 22, 2010, 3 pages.
Final Office Action for U.S. Appl. No. 12/323,373 mailed May 31, 2011, 6 pages.
Final Office Action for U.S. Appl. No. 12/323,373 mailed Feb. 17, 2012, 8 pages.
Non-final Office Action for U.S. Appl. No. 12/323,373 mailed May 3, 2012, 7 pages.
Non-final Office Action for U.S. Appl. No. 12/758,458 mailed Sep. 3, 2010, 7 pages.
Notice of Allowance for U.S. Appl. No. 12/758,458 mailed Dec. 28, 2010, 8 pages.
Non-final Office Action for U.S. Appl. No. 13/206,157 mailed Apr. 11, 2013, 10 pages.
Final Office Action for U.S. Appl. No. 13/206,157 mailed Aug. 22, 2013, 9 pages.
Advisory Action for U.S. Appl. No. 13/206,157 mailed Nov. 12, 2013, 3 pages.
Non-final Office Action for U.S. Appl. No. 13/456,755 mailed Jan. 3, 2014, 21 pages.
Non-final Office Action for U.S. Appl. No. 29/264,332 mailed Apr. 22, 2008, 7 pages.
Notice of Allowance for U.S. Appl. No. 29/264,332 mailed Sep. 3, 2008, 6 pages.
International Search Report for PCT/US2013/1037785 mailed Aug. 9, 2013, 2 pages.
Patent Cooperation Treaty, Annex to the Invitation to Pay Additional Fees, Communication Relating to the Results of the Partial International Search, International Application No. PCT/US07/012281 mailed Jul. 11, 2008, 4 pages.
International Search Report for PCT/US2008/1004344 mailed Aug. 19, 2008, 3 pages.
International Search Report for PCT/US2008/010766 mailed Dec. 19, 2008, 3 pages.
International Search Report for PCT/US06/44993 mailed Mar. 29 2007, 2 pages.
International Search Report for PCT/US10/53026 mailed Feb. 8, 2011, 3 pages.
International Search Report for PCT/US2007/12281 mailed Jul. 11, 2008, 4 pages.
International Search Report for PCT/US2008/04344 mailed Aug. 19, 2008, 3 pages.
International Search Report for PCT/US2008/10766 mailed Dec. 19, 2008, 3 pages.
International Search Report for PCT/US2009/057069 mailed Feb. 24, 2010, 2 pages.
Monro, et al., "Holey Fibers with Random Cladding Distributions," Optics Letters, vol. 25, No. 4, Feb. 15, 2000, 3 pages.
Pickrell, et al., "Novel Techniques for the Fabrication of Holey Optical Fibers," SPIE Conference Proceedings, Fiber Optic Sensor Technology and Applications, vol. 4578, pp. 271-282, 2001.
Gibson, et al., "Evanescent Field Analysis of Air-Silica Microstructure Waveguides," IEEE, 1-7803-7104-4/01, 2001, pp. 709-710.
International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.
International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.
Kagan, Val et al., "Recent Advances and Challenges in Induction Welding of Reinforced Nylon in Automotive Application," SAE Technical Paper, No. 2004-01-0733, Presented at SAE 2004 World Conference and Exhibition, Mar. 8-11, 2004, Detroit, Michigan, SAE International, 8 pages.
Final Office Action for U.S. Appl. No. 13/206,157 mailed Mar. 6, 2014, 10 pages.

\* cited by examiner

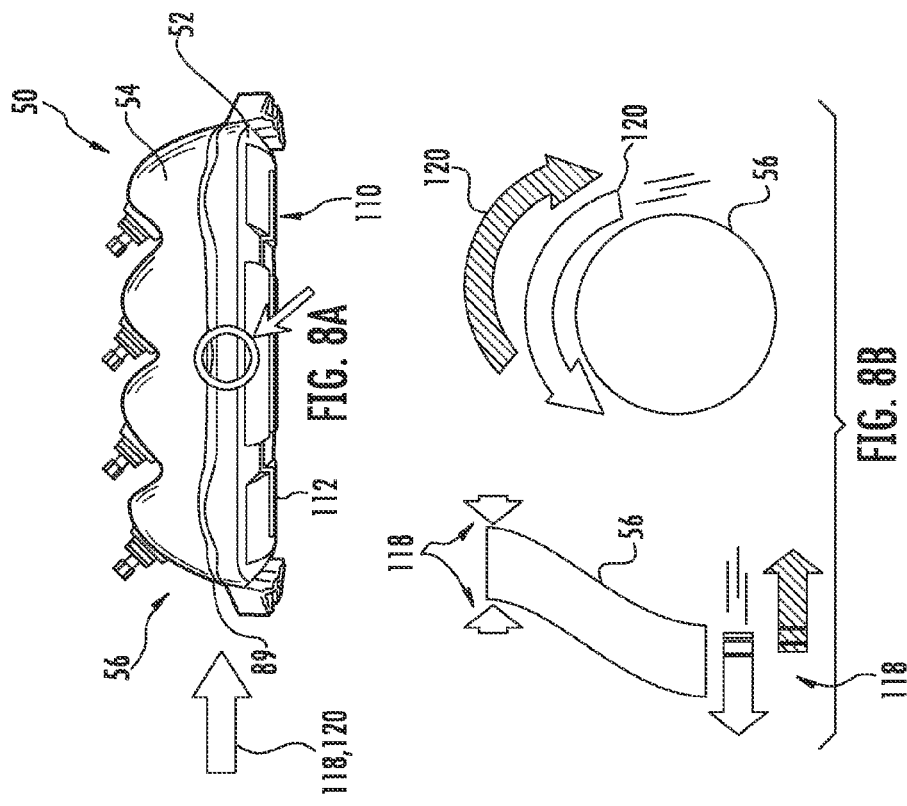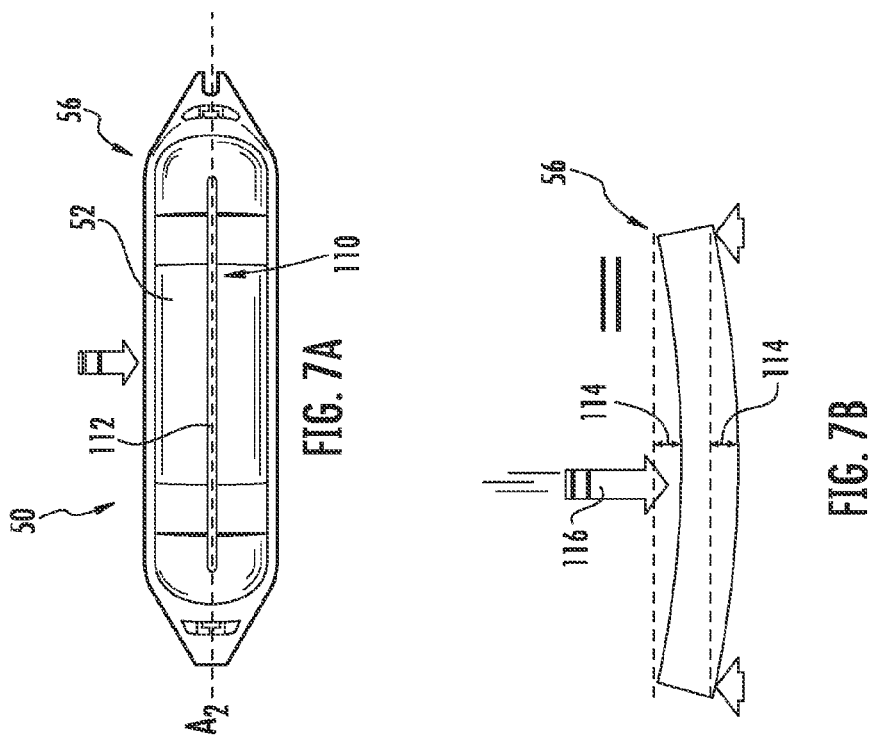

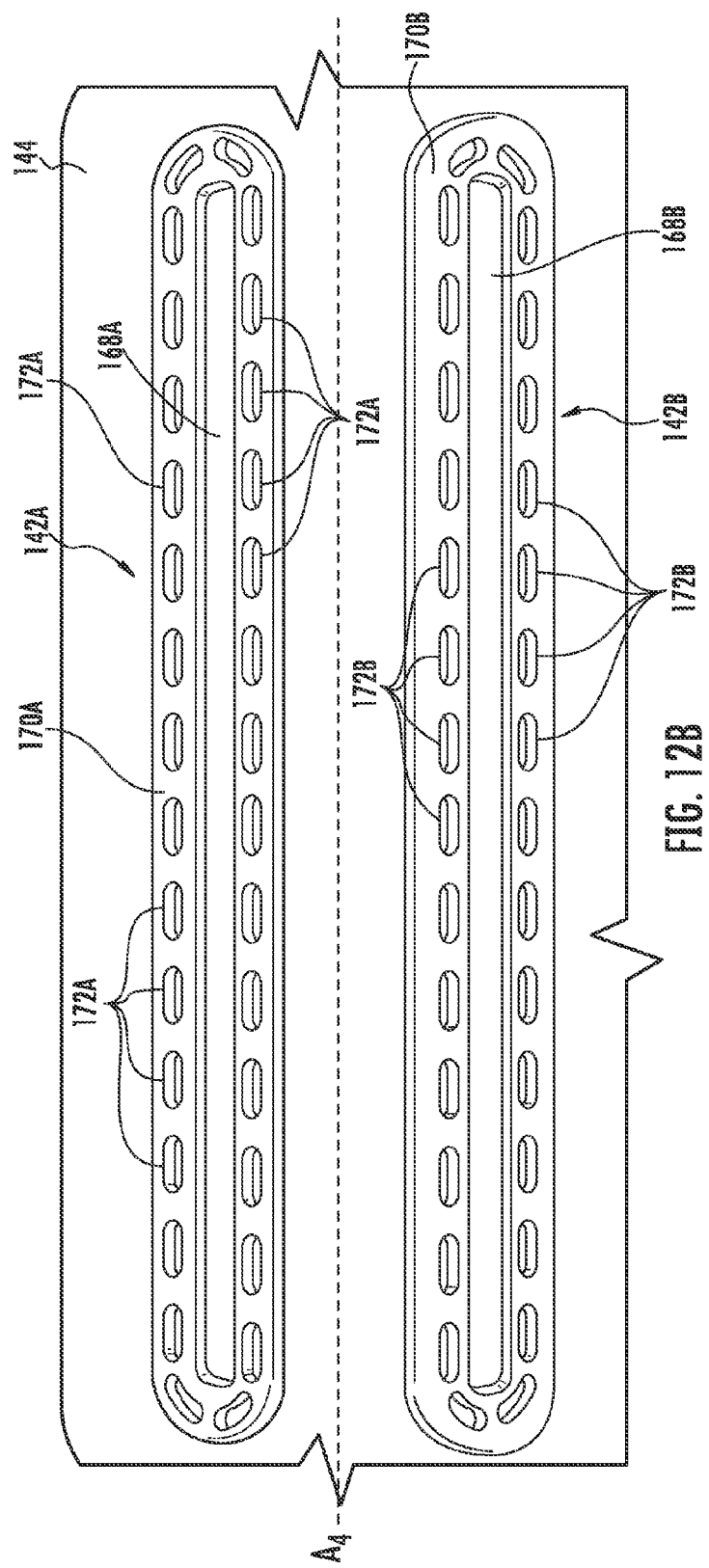

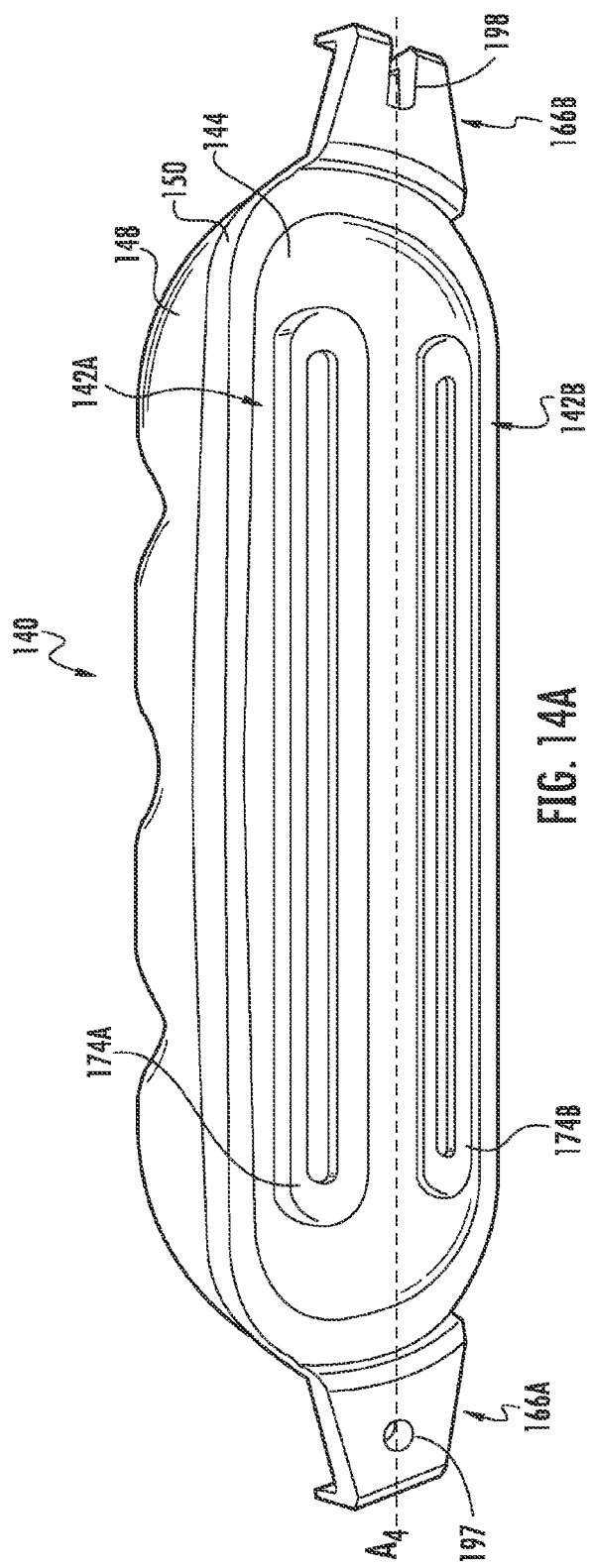

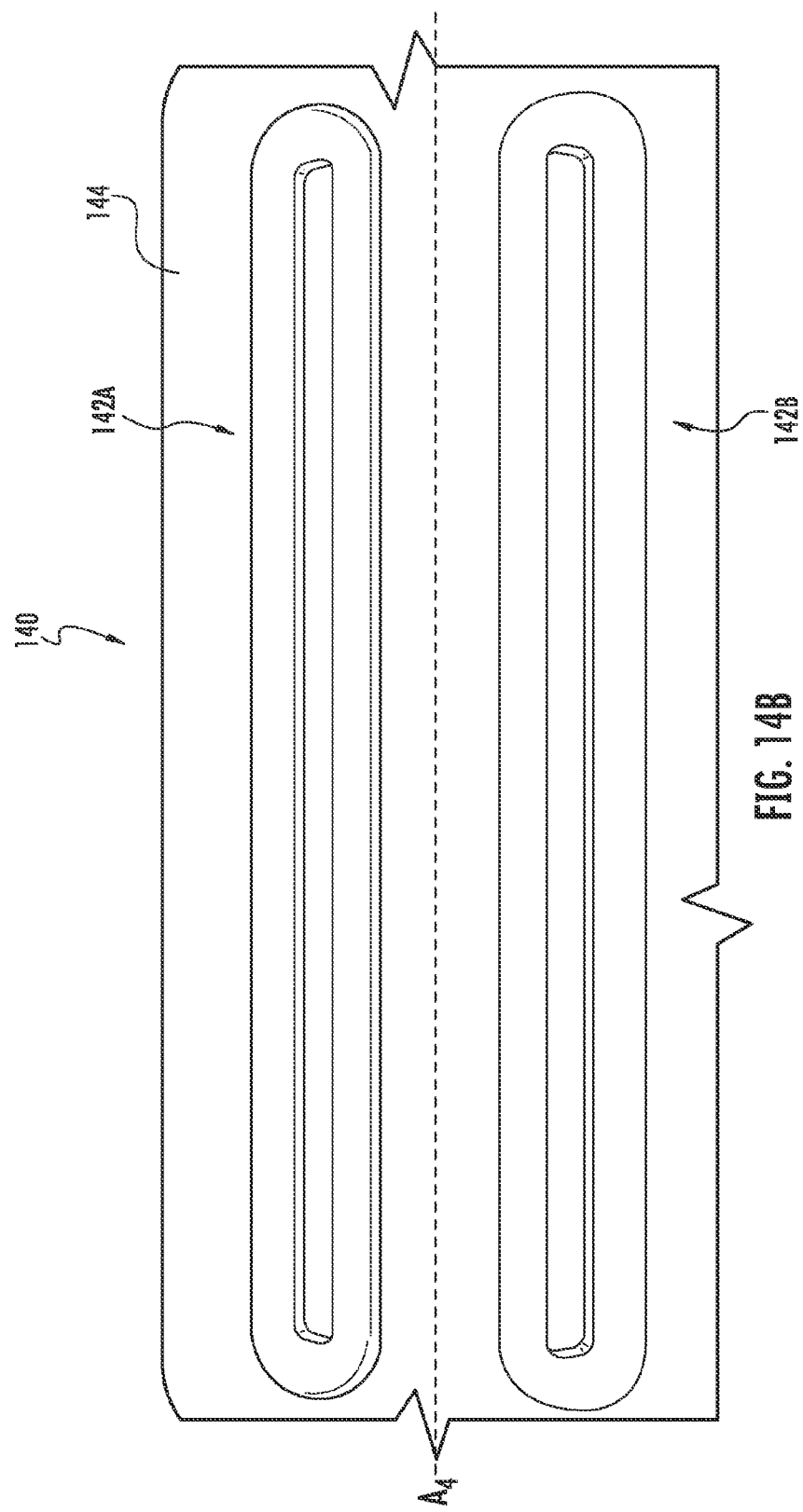

| NOTES 182 | DESIGN VERSION 184 | TIME INTERVAL ($t_0$ to $t_{max}$ for deflection) $\Delta t$ (msec) 186 | MAXIMUM DEFLECTION (INCHES) 188 |
|---|---|---|---|
| 124 | WELDED PARTS | 1.76 | 0.136 |
| 168A, 168B | 0.8" FROM EDGE OF MP | 4.3 | 0.374 |
| 168A, 168B | 0.5" FROM EDGE OF MP | 4.84 | 0.483 |
| 174A, 174B | 0.5" FROM EDGE OF MP | 3.5 | 0.323 |

FIG. 16

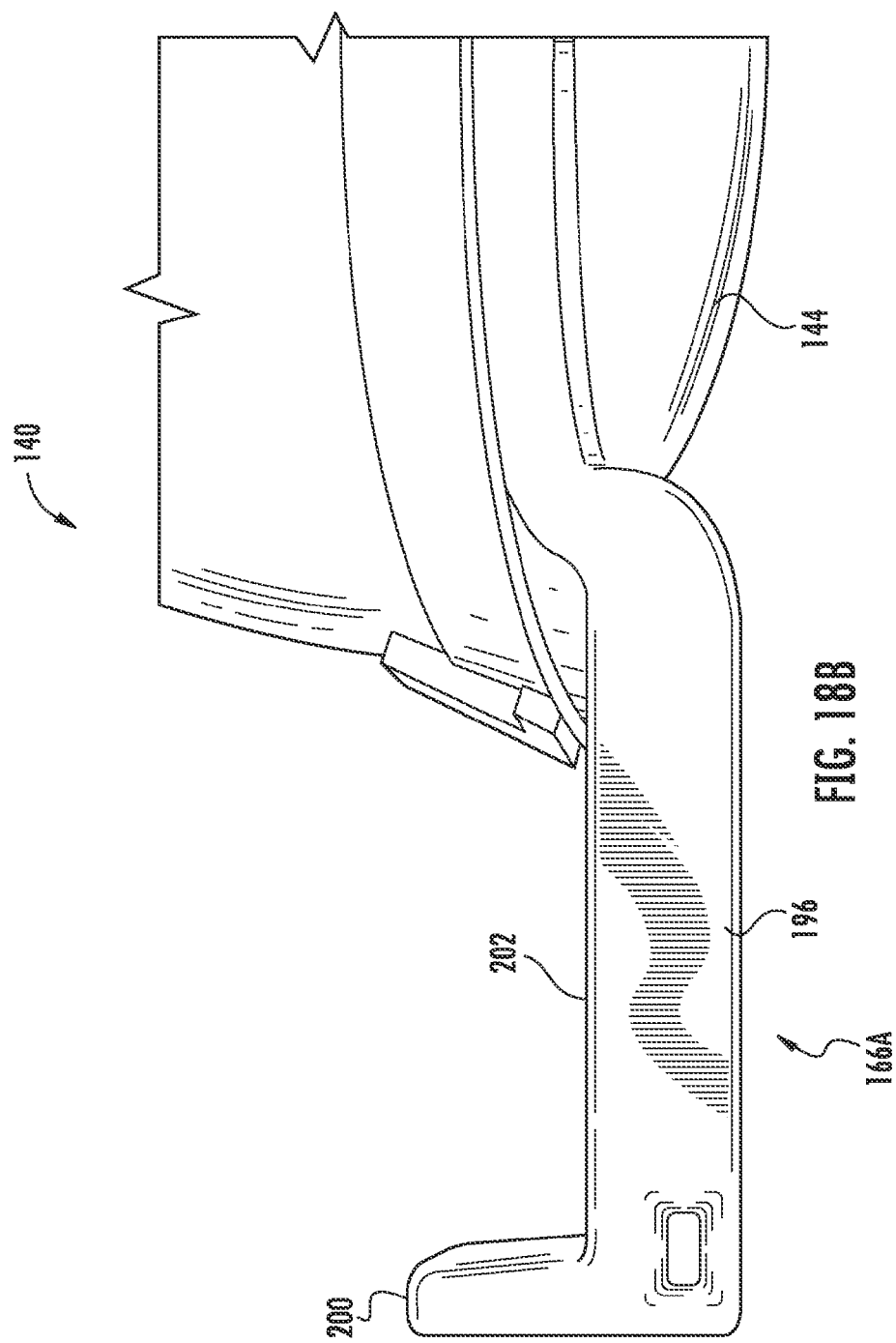

IMPACT RESISTANT FIBER OPTIC ENCLOSURES AND RELATED METHODS

RELATED APPLICATIONS

This application claims the benefit of priority under 35 U.S.C. §119 of U.S. Provisional Application Ser. No. 61/407,739 filed on Oct. 28, 2010 the content of which is relied upon and incorporated herein by reference in its entirety The present application is related to U.S. Pat. No. 7,740,409 entitled "Multi-port optical connection terminal," which is incorporated herein by reference in its entirety.

The present application is also related to U.S. Pat. No. 7,333,708 entitled "Multi-port optical connection terminal," which is incorporated herein by reference in its entirety.

The present application is also related to U.S. Pat. No. 7,302,152 entitled "Overmolded multi-port optical connection terminal having means for accommodating excess fiber length," which is incorporated herein by reference in its entirety.

The present application is also related to U.S. Pat. No. 7,120,347 entitled "Multi-port optical connection terminal," which is incorporated herein by reference in its entirety.

BACKGROUND

1. Field of the Disclosure

The technology of the disclosure relates to enclosures for fiber optic components and/or equipment, such as multi-port optical connection terminals as an example.

2. Technical Background

Optical fiber is increasingly being used for a variety of broadband applications including voice, video, and data transmissions. As a result of the ever-increasing demand for broadband communications, fiber optic networks typically include a large number of mid-span access locations at which one or more optical fibers are branched from a distribution cable. These mid-span access locations provide a branch point from the distribution cable leading to an end user, commonly referred to as a subscriber, and thus, may be used to extend an "all optical" communications network closer to the subscriber. In this regard, fiber optic networks are being developed that deliver "fiber-to-the-premises" (FTTP). Due to the geographical spacing between the service provider and the various subscribers served by each mid-span access location, optical connection terminals, such as closures, network terminals, pedestals, and the like, are needed for interconnecting optical fibers of drop cables extending from the subscribers with optical fibers of the distribution cable extending from the service provider to establish the optical connections necessary to complete the FTTP communications network.

To protect fiber optic components and/or equipment from damage due to exposure to the environment, enclosures can be provided to enclose or encase fiber optic components and/or equipment that may be used to establish fiber optic connections in a fiber optic network. For example, a multi-port optical connection terminal is one example of fiber optic equipment that includes an enclosure. A multi-port terminal provides an enclosure to house and protect interconnections of optical fibers from one or more drop fiber optic cables extended in the enclosure at a branch point to fiber optic connectors disposed in the enclosure. Other examples of fiber optic equipment that include enclosures include, but are not limited to, terminals for terminated ends of fiber optic cables, local convergence points (LCP), fiber distribution terminals (FDT), splice closures, fiber interconnection closures, canister-type closures, and network interface device (NID) closures, including those where a hermetic seal may be required. Each of these enclosures can incur impact from various conditions, including installation in outdoor environments, access for configuration and re-configuration, under-earth installations, etc. Thus, it is important that the enclosures be able to withstand certain impact forces to continue to protect fiber optic components and/or equipment contained within the enclosures. Further, because materials used to form the enclosure may respond to impact forces differently at different temperatures, it is important that the enclosures be able to withstand impact forces at varying defined temperatures.

SUMMARY OF THE DETAILED DESCRIPTION

Embodiments disclosed in the detailed description include impact resistant fiber optic enclosures for fiber optic components, and related methods. In one embodiment, a fiber optic enclosure is provided and comprises a housing. The housing comprises a base, a cover, and a seal disposed between the cover and the base to secure the cover to the base and to define an interior cavity configured to support one or more fiber optic components therein. At least one expandable joint is disposed in the housing. The at least one expandable joint is configured to break the continuity of the housing material to deflect and/or assist in deflecting an impact load(s) applied to the housing to prevent damage to the housing and/or the seal. In this manner, any fiber optic components disposed in the interior cavity are protected from being damaged and/or from being exposed to the environment outside of the interior cavity. The at least one expandable joint may be disposed in one of the cover and the base, or both. The at least one expandable joint may comprise two or more expandable joints, wherein each are configured to absorb and deflect and/or assist in deflecting an impact load(s) applied to the housing. The at least one expandable joint may assist in absorbing and deflecting and/or assist in deflecting compression, tensile, shear, and/or torsional impact loads as examples.

In another embodiment, an optical connection terminal for use at a branch point in a fiber optic communications network is provided. The optical connection terminal includes a housing. The housing comprises a base, a cover, and a seal disposed between the cover and the base to attach the cover to the base and define an interior cavity configured to support one or more fiber optic components therein. The housing also comprises a stub cable port provided in one of the base and the cover through an exterior wall. The housing also comprises a plurality of connector ports provided in an exterior wall of at least one of the base and the cover, each connector port extending through the exterior wall and configured to receive one of a plurality of fiber optic connectors disposed within the interior cavity. To assist in deflecting an impact load applied to the housing, at least one expandable joint or expandable hinge comprised of an opening is provided and disposed through an exterior wall of at least one of the cover and the base.

In another embodiment, a method of assembling a fiber optic enclosure is provided. The method comprises providing a base. The method also comprises providing a cover wherein at least one of the base and the cover includes at least one expandable joint configured to deflect an impact load. The method also comprises attaching the cover to the base to define an interior cavity configured to support one or more fiber optic components therein. The method also comprises disposing a seal between the cover and the base to secure the cover to the base.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 7A illustrates a bottom view of the exemplary multi-port optical connection terminal in FIG. 6;

FIG. 7B illustrates how the multi-port optical connection terminal of FIG. 7A can respond to a compressive impact load applied to a side of the multi-port optical connection terminal;

FIG. 8A illustrates a side perspective view of the multi-port optical connection terminal of FIG. 7A;

FIG. 8B illustrates how the fiber optic enclosure of FIG. 7A can respond to shear and torsional impact loads applied to the multi-port optical connection terminal;

FIG. 12A illustrates a bottom perspective view of the multi-port optical connection terminal of FIG. 11 with two expandable joints disposed in the cover of the fiber optic enclosure;

FIG. 12B illustrates a close-up view of two expandable joints illustrated in FIG. 12A disposed in the cover of the multi-port optical connection terminal of FIG. 11;

FIG. 14A illustrates a bottom perspective view of an exemplary multi-port optical connection terminal fiber optic enclosure with two overmolded expandable joints disposed in the cover of the multi-port optical connection terminal;

FIG. 14B illustrates a close-up view of the two overmolded expandable joints illustrated in FIG. 14A disposed in the cover of the multi-port optical connection terminal of FIG. 14A;

FIG. 16 is a chart illustrating the relative deflection characteristics between a fiber optic enclosure without expandable joints and fiber optic enclosures with multiple non-overmolded and overmolded expandable joints;

FIGS. 18A and 18B are top and side views, respectively, of the shear and/or torsional load impact resistant mounting tab structural elements in FIG. 17B.

DETAILED DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include impact resistant fiber optic enclosures for fiber optic components, and related methods. In one embodiment, a fiber optic enclosure is provided and comprises a housing. The housing comprises a base, a cover, and a seal disposed between the cover and the base to secure the cover to the base and to define an interior cavity configured to support one or more fiber optic components therein. At least one expandable joint is disposed in the housing. The at least one expandable joint is configured to break the continuity of the housing material to deflect and/or assist in deflecting an impact load(s) applied to the housing to prevent damage to the housing and/or the seal. In this manner, any fiber optic components disposed in the interior cavity are protected from being damaged and/or from being exposed to the environment outside of the interior cavity. The at least one expandable joint may be disposed in one of the cover and the base, or both. The at least one expandable joint may comprise two or more expandable joints, wherein each are configured to absorb and deflect and/or assist in deflecting an impact load(s) applied to the housing. The at least one expandable joint may assist in absorbing and deflecting and/or assist in deflecting compression, tensile, shear, and/or torsional impact loads as examples.

Figure 1:
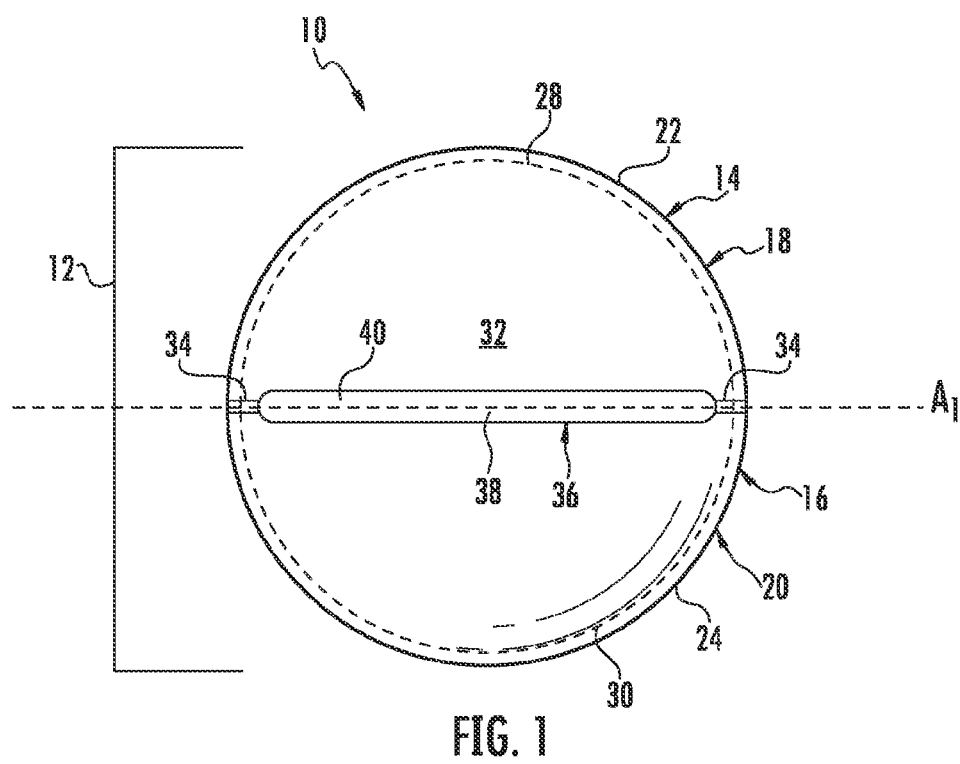
FIG. 1 is a side view of an exemplary fiber optic enclosure incorporating an expandable joint.

In this regard, FIG. 1 discloses an exemplary fiber optic enclosure 10. In this embodiment, the fiber optic enclosure 10 is spherical-shaped, but may be provided as any other type of shape desired. The fiber optic enclosure 10 may be configured to support any fiber optic component(s) or equipment desired. As non-limiting examples, the fiber optic enclosure 10 may be configured as a multi-port optical connection terminal, a terminal for terminated ends of fiber optic cables, a local convergence point (LCP), a fiber distribution terminal (FDT) splice closure, a fiber interconnection closure, a canister-type closure, or a network interface device (NID) closure, including but not limited to those where a hermetic seal is employed. In this embodiment, the fiber optic enclosure 10 is comprised of a housing 12 to provide a rigid exoskeleton structure for protecting fiber optic components disposed therein from damage and/or the environment outside the housing 12. The housing 12 in this embodiment is comprised of a base 14 and a cover 16. Providing a separate base 14 and cover 16 allows fiber optic components to be disposed inside the housing 12 before the housing 12 is sealed. Although not shown in FIG. 1 the fiber optic enclosure 10 may have more than one seal. As a non-limiting example, the fiber optic enclosure 10 may have a base with more than one cover with each cover having a seal between the cover and the base.

The base 14 and cover 16 may both be molded pieces. In this embodiment, the base 14 and cover 16 each define walls 18 and 20, respectively, of a defined thickness, having an exterior surface 22 and 24, respectively, and an interior surface 28 and 30, respectively. Thus, when the base 14 and cover 16 are attached to each other, an interior cavity 32 is formed therein inside the interior surfaces 28, 30. To secure the cover 16 to the base 14 and protect any fiber optic components disposed in the internal cavity 32 from the environment, a seal 34 may be disposed therebetween. For example, the seal 34 may be comprised of a weld, such as an ultrasonic weld, to secure the cover 16 to the base 14. Other methods of securing the cover 16 to the base 14, such as an adhesive for example, may alternatively be employed.

Because the intended use and environment of the fiber optic enclosure 10 may subject to the housing 12 to certain impact loads, the housing 12 may be designed to be impact resistant. Providing an impact resistant housing 12 serves to protect any fiber optic components disposed in the interior cavity 32 from damage and/or the environment outside the housing 12. In this regard as an example, the base 14 and the cover 16 may be constructed out of a hardened flexible material, such as polymer material, plastic, thermoplastic, composite, or aluminum, as examples, to absorb and deflect impact loads under varying environmental conditions, including low temperatures to at least about negative forty degrees Celsius (−40° C.) as an example. Examples of such hardened polymer materials include, but are not limited to, polypropylene, polypropylene copolymers, polystyrene, polyethylene, ethylene vinyl acetate (EVA), polyolefin, including metallocene catalyzed low density polyethylene, thermoplastic olefin (TPO), thermoplastic polyester, thermoplastic vulcanizate (TPV), polyvinyl chlorides (PVC), chlorinated polyethylene, styrene block copolymers, ethylene methyl acrylate (EMA), ethylene butyl acrylate (EBA), and derivatives thereof. Other materials may be employed.

When the seal 34 is provided to secure the cover 16 to the base 14, the resulting stiffness of the housing 12 as a unit is increased. As a result, the housing 12 may shatter under the same impact load conditions that would not shatter the cover 16 and base 14 without the inclusion of the seal 34. The cover 16 and base 14 could be made from materials that have greater impact resistance to offset the increased stiffness that results from providing the seal 34 otherwise, but at a higher cost. It was determined that providing one or more impact resistant expandable joints disposed in the housing of a fiber optic enclosure allows the fiber optic enclosure to be more impact resistant even with the presence of a seal between a cover and base of the fiber optic enclosure. Providing one or more expandable joints breaks the continuity of a housing that is overly stiff or made overly stiff by inclusion of a seal. In this regard, embodiments disclosed herein provide at least one expandable joint disposed in the housing of a fiber optic enclosure to absorb and deflect and/or assist in deflecting an impact load(s) applied to the housing.

In this regard with reference to FIG. 1, an expandable joint 36 is disposed in the housing 12 of the fiber optic enclosure 10. The expandable joint 36 may be a hinge as an example. The expandable joint 36 in this embodiment is comprised of an opening 38 in the housing 12 to break the continuity of the housing 12 and thus decrease the stiffness of the housing 12. The opening 38 is elongated along a longitudinal axis $A_1$ in this embodiment, as illustrated in FIG. 1. The expandable joint 36 increases the absorption of an impact load and the deflection of the housing 12 in response to an impact load and thus is designed to present shattering of the housing 12 when made more rigid or stiff due to the inclusion of the seal 34 between the cover 16 and the base 14.

The opening 38 in this embodiment of the fiber optic enclosure 10 in FIGS. 1-4 is comprised of a void in the material of the cover 16 and the base 14 such that the opening 38 is formed in the housing 12 when the cover 16 is brought in contact with the base 14 as illustrated in FIG. 1. The opening 38 is disposed about the equatorial center of the housing 12 in this embodiment, but such is not required. The expandable joint 36 may be disposed exclusively in the cover 16 or the base 14. Also, more than one expandable joint 36 may be disposed in the housing 12 to achieve the desired increase in absorption and deflection as long as the desired structural integrity of the housing 12 is maintained.

An optional overmolding material 40 may be disposed in the opening 38 to form an overmolded expandable joint 36. The overmolding material 40 seals the interior cavity 32 from the environment outside the housing 12. The overmolding material 40 may also increase the flexibility of the expandable joint 36 and its ability to absorb and deflect an impact load. For example, the overmolding material 40 may be comprised of exemplary materials, such as santoprene, evoprene, kraton, silicone rubber, or other elastomeric or flexible materials, including but not limited to those having a low modulus of elasticity for increased flexibility. For example, the modulus of elasticity may be between 1,000 and 300,000 pounds per square inch (psi).

Figure 2:
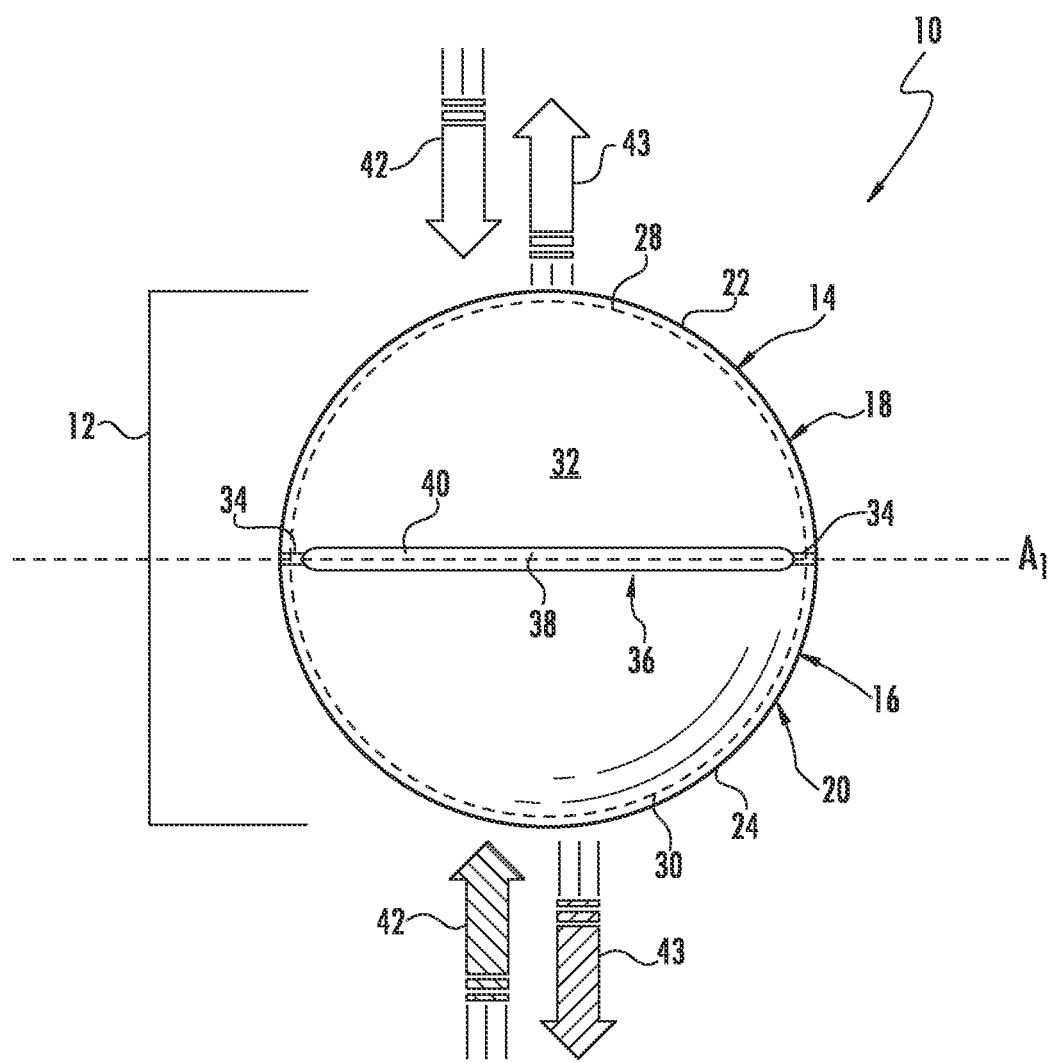
FIG. 2 is a side view of the fiber optic enclosure of FIG. 1 responding to compressive and tensile impact loads.

As an example, FIG. 2 illustrates the fiber optic enclosure 10 of FIG. 1 when placed under a bending or compressive impact load 42 and a tensile impact load 43. In this regard, the expandable joint 36 absorbs at least a portion of the compressive impact load 42 to prevent the cover 16 and the base 14 from absorbing the entire compressive load 42 and possibly shattering the housing 12, breaking the seal 34, and/or separating the cover 16 from the base 14 as a result. The expandable joint 36 also absorbs and deflects or assists in deflecting the compressive impact load 42 to return the housing 12 back to its original configuration in FIG. 1. The expandable joint 36 also deforms to deflect at least a portion of the tensile impact load 43 to prevent the cover 16 and the base 14 from deflecting the entire tensile impact load 43 and possibly shattering the housing 12, breaking the seal 34, and/or separating the cover 16 from the base 14 as a result.

Additionally, instead of a compressive impact load 42, an increasing compressive pressure 42 may be applied to the housing 12. Typically, when the increasing compressive pressure 42 reaches a magnitude that exceeds the elastic stability of the housing 12, the structural integrity of the housing 12 may fail either by fracture or permanent deformation. In this case, the expandable joint 36 can provide a spring function to withstand the increasing compressive pressure 42, inhibiting structural failure and preventing the breaking of the seal 34 and/or the separating of the cover 16 from the base 14. Further, the expandable joint 36 allows the housing 12 to return to its initial undeformed state when the increasing compressive pressure 42 is removed.

Figure 3:
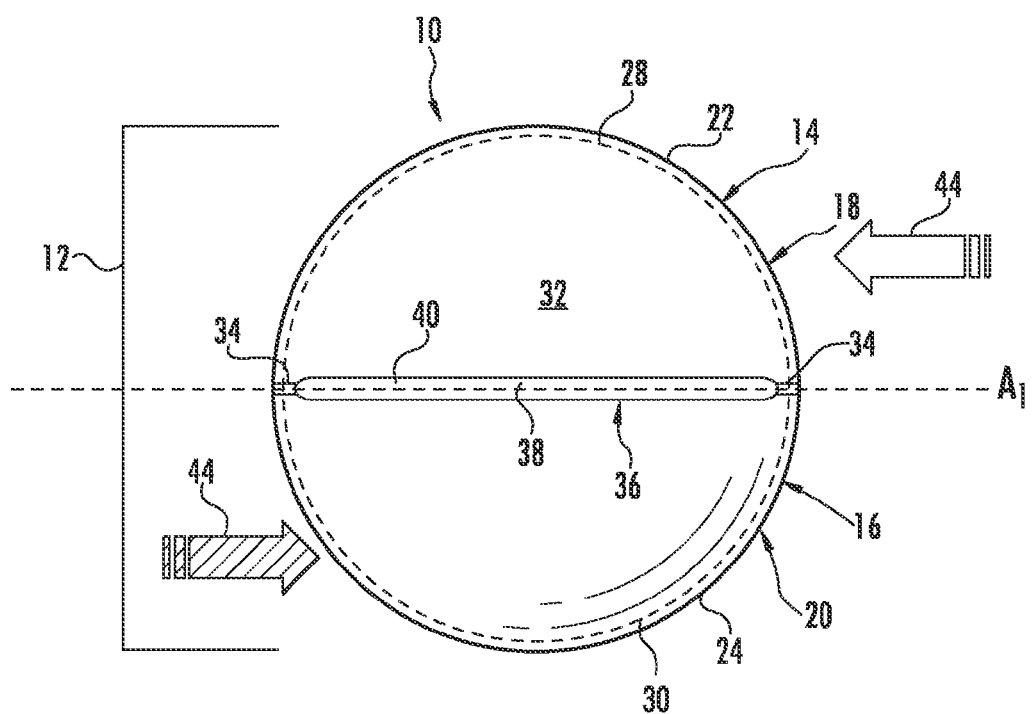
FIG. 3 is a side view of the fiber optic enclosure of FIG. 1 responding to a shear impact load.

FIG. 3 illustrates the fiber optic enclosure 10 of FIG. 1 when placed under a shear impact load 44. In this regard, the expandable joint 36 absorbs at least a portion of the shear impact load 44 to prevent the cover 16 and the base 14 from absorbing the entire shear impact load 44 and possibly shattering the housing 12, breaking the seal 34, and/or separating the cover 16 from the base 14 as a result. The expandable joint 36 also absorbs and deflects or assists in deflecting the shear impact load 44 to return the housing 12 back to its original configuration in FIG. 1.

Figure 4:
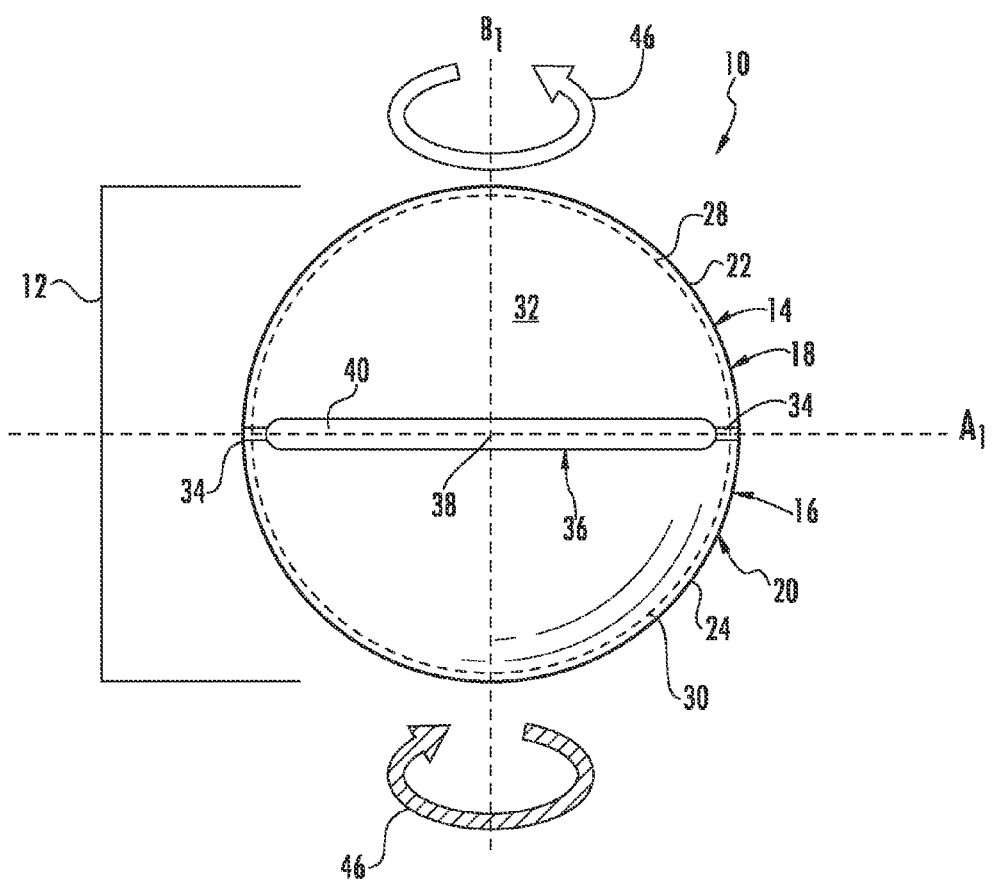
FIG. 4 is a side view of the fiber optic enclosure of FIG. 1 responding to a torsional impact load.

FIG. 4 illustrates the fiber optic enclosure 10 of FIG. 1 when placed under a torsion impact load 46. In FIG. 4, the torsion impact load 46 is shown as being applied in opposite directions around transverse axis "B1." Transverse axis "B1" may be at the same or a different angular orientation than longitudinal axis "A1," including, but not limited to orthogonal to longitudinal axis "A1." In this regard, the expandable joint 36 absorbs at least a portion of the torsion impact load 46 to prevent the cover 16 and the base 14 from absorbing the entire torsion impact load 46 and possibly shattering the housing 12, breaking the seal 34, and/or separating the cover 16 from the base 14 as a result. The expandable joint 36 also absorbs and deflects or assists in deflecting the torsion impact load 46 to return the housing 12 back to its original configuration in FIG. 1.

Figure 5:
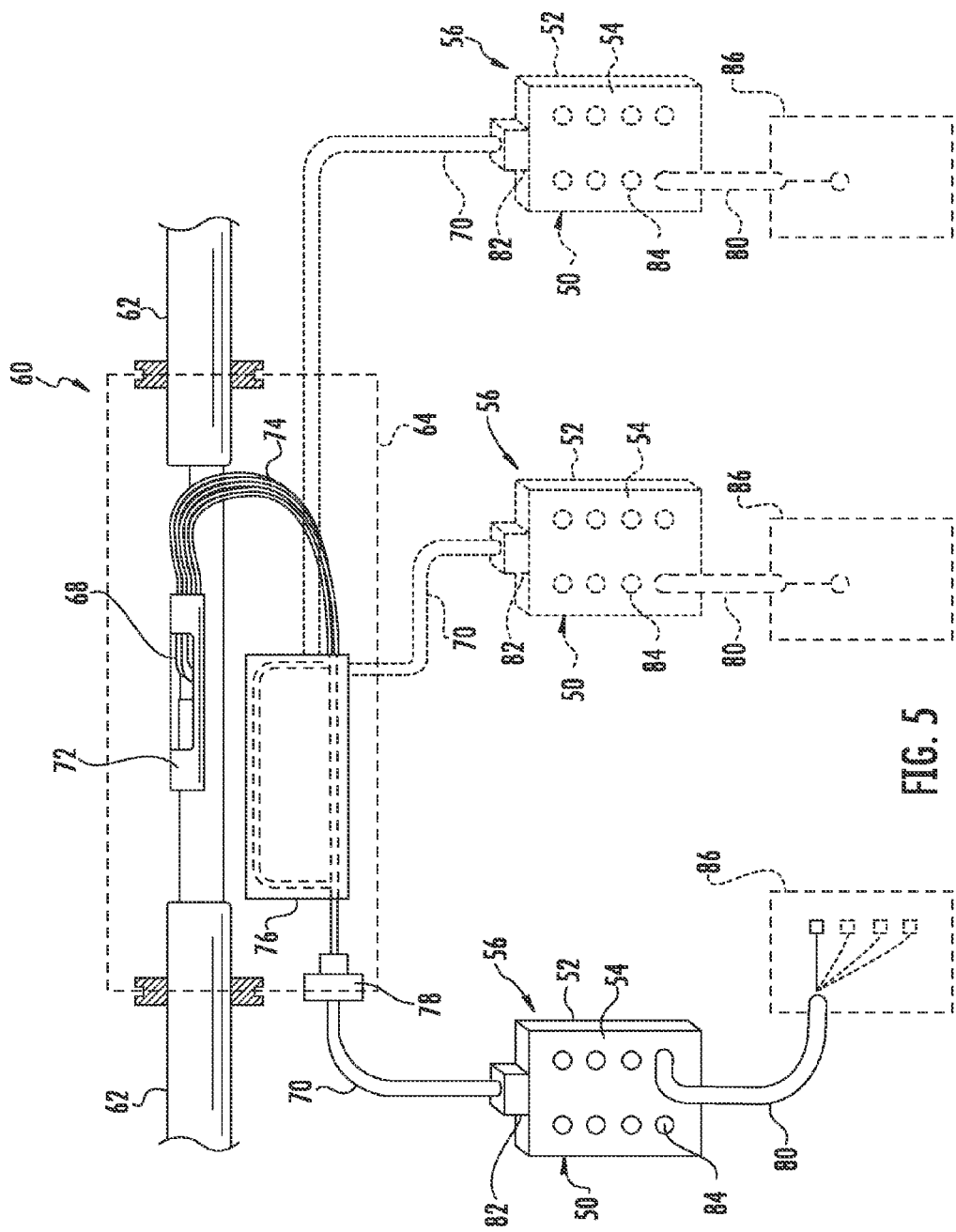
FIG. 5 is a schematic of a portion of a fiber optic communications network constructed in accordance with an exemplary embodiment including a distribution cable having a mid-span access location, a multi-port optical connection terminal fiber optic enclosure comprising a fiber optic enclosure and having a stub cable extending therefrom that is connected to the distribution cable at the mid-span access location, and at least one drop cable extending from the multi-port optical connection terminal to another location in the network, such as a subscriber premises.

A housing that includes one or more expandable joints may be provided for any type of fiber optic enclosure. One example of such a fiber optic enclosure is the multi-port optical connection terminal 50 (also referred to herein as "connection terminal 50") illustrated in FIGS. 5 and 6 and described in more detail below in this disclosure. The connection terminal 50 illustrated in FIGS. 5 and 6 includes at least one expandable joint disposed in a cover 52, which is secured to a base 54 to form a housing 56 of the connection terminal 50. With reference to FIG. 5, the connection terminal 50 is provided to provide connection access to a fiber optic communications network 60, a portion of which is illustrated in FIG. 5. In this embodiment, the fiber optic communications network 60 comprises a fiber optic distribution cable 62. At least one (as shown), and preferably a plurality of mid-span access locations are provided along the length of the distribution cable 62. The mid-span access locations may be factory-prepared with preterminated or pre-connectorized optical fibers at predetermined branch points on a distribution cable for a pre-engineered fiber optic communications network. Alternatively, the mid-span access locations may be field-prepared at branch points formed on a previously deployed distribution cable. Regardless, the mid-span access locations are enclosed and protected from exposure to the environment by a closure 64.

Figure 6:
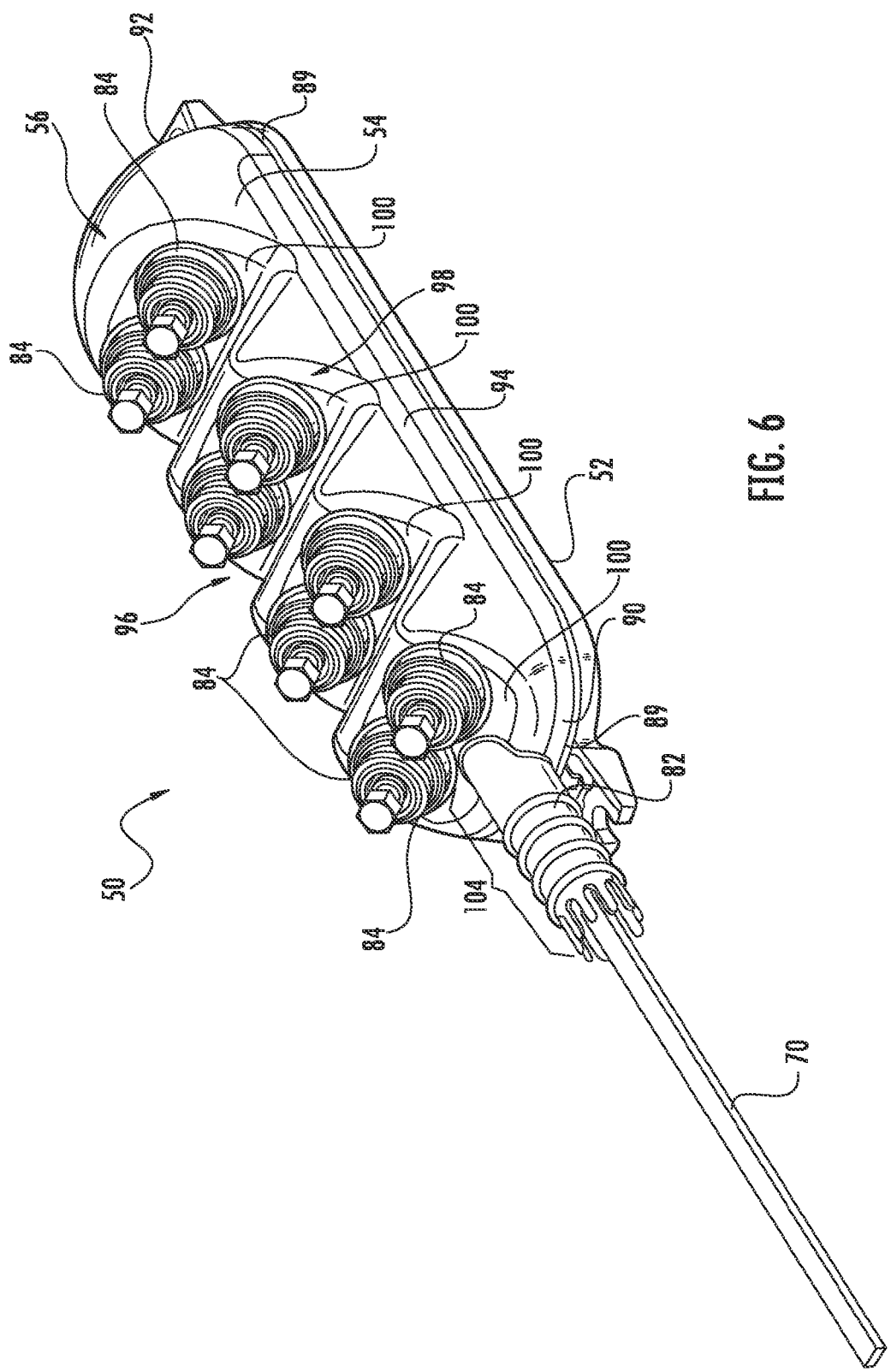
FIG. 6 is a front perspective view of an exemplary multi-port optical connection terminal comprising a fiber optic enclosure and including a plurality of connector ports, a stub cable port, and a stub cable assembly, and an expandable joint to deflect or assist in absorbing and deflecting impact load(s)

As illustrated in FIGS. 5 and 6, the distribution cable 62 can be factory-prepared with at least one mid-span access location for providing access to at least one preterminated optical fiber 68 at a predetermined branch point in the fiber optic communications network 60. In one embodiment, the fiber optic communications network 60 comprises the fiber optic distribution cable 62 having a plurality of mid-span access locations at branch points spaced along the length of the distribution cable 62, each providing access to at least one, and preferably the plurality of optical fibers 68 of the fiber optic communications network 60. Thus, the distribution cable 62 provides multiple locations for joining a stub cable 70 of at least one connection terminal 50 to the fiber optic distribution cable 62 at each mid-span access location.

In the exemplary fiber optic communications network 60, the preterminated optical fibers 68 of the distribution cable 62 provided at the mid-span access location are routed out of the distribution cable 62 via an optical fiber transition element 72 and into corresponding hollow protective tubes 74. The optical fiber transition element 72 may comprise any structure that permits the preterminated optical fibers 68 to transition from the fiber optic distribution cable 62 without excessive stress, strain, or bending. The protective tubes 74 containing the preterminated optical fibers 68 are routed into one or more splice trays 76. The ends of the preterminated optical fibers 68 are spliced to respective optical fibers of the stub cable 70 extending from the connection terminal 50. The manner in which the protective tubes 74 are routed to the splice trays 76 and the manner in which the preterminated optical fibers 68 are spliced to the optical fibers of the stub cable 70 are known. Furthermore, the preterminated optical fibers 68 and/or the optical fibers of the stub cable 70 may be pre-connectorized in the factory, or may be connectorized in the field (for example, mechanically spliced to field-installable connectors or dressed and fusion spliced to pigtails), and the splice trays 76 replaced with conventional connector adapter sleeves. Alternatively, the optical fibers 68 may be accessed in the field at a mid-span access location, dressed, and spliced or connectorized in any manner and optically connected to respective optical fibers of the stub cable 70.

The optical fibers of the stub cable 70 enter the closure 64 through a suitable cable port 78 provided through an exterior wall, for example an end wall, of the closure 64. The stub cable 70 includes at least one, and preferably a plurality of optical fibers disposed within a protective cable sheath. As will be readily appreciated by those skilled in the art, the stub cable 70 may be any known fiber optic cable comprising at least one optical fiber and having a fiber count equal to or greater than that of a drop cable 80 to be connected to the connection terminal 50 and equal to or less than that of the distribution cable 62. The stub cable 70 may comprise a tubular body, such as, but not limited to, a buffer tube, a monotube, or a tube formed from a water-swellable tape. In preferred embodiments, the stub cable 70 is flexible, easy to route, and has no preferential bend.

The stub cable 70 extends from the closure 64 into the connection terminal 50 through a stub cable port 82 provided through an exterior wall of the connection terminal 50. The optical fibers of the stub cable 70 within the connection terminal 50 are pre-connectorized and the optical connectors are inserted into a conventional adapter sleeve seated in a respective one of connector ports 84 provided through an exterior wall of the connection terminal 50. At least one, and preferably more than one pre-connectorized drop cable 80 is thereafter interconnected with a respective connectorized optical fiber of the stub cable 70 by inserting the pre-connectorized end of the drop cable 80 into an adapter sleeve seated in the connector port 84 from the exterior of the connection terminal 50. The stub cable port 82 of the connection terminal 50 sealingly receives the stub cable 70 and the plurality of connector ports 84 are operable for receiving the pre-connectorized optical fibers of the stub cable 70 and the connectorized ends of the drop cables 80. The drop cables 80 can comprise at least one single mode or multimode optical fiber of any type optically connected to a single fiber or multi-fiber optical connector in a conventional manner. The other ends of the drop cables 80 are optically connected to respective optical fibers of the fiber optic communications network 60 within a conventional outside plant connection terminal 86, such as an outside plant network access point (NAP) closure, local convergence cabinet (LCC), terminal, pedestal or network interface device (NID) of the types available from Corning Cable Systems LLC of Hickory, N.C.

An exemplary embodiment of the connection terminal 50 constructed in accordance with the present disclosure is illustrated in FIG. 6. As illustrated in FIG. 6, this connection terminal 50 comprises the housing 56 comprised of the base 54 and the cover 52. The base 54 and cover 52 may both be molded pieces. A seal 89 is disposed between the cover 52 and the base 54 to secure the cover 52 to the base 54. The base 54 has opposed end walls 90, 92, respectively, and sidewalls 94, 96, respectively. The base 54 is further provided with an upper surface 98. The upper surface 98 of the base 54 is provided with a plurality of angled or sloped surfaces 100. Each angled surface 100 has at least one connector port 84 formed therethrough. Further, the base 54 is box-shaped in this embodiment and defines an interior cavity (not shown) for housing fiber optic hardware, such as connector ports, adapters, optical fiber routing guides, fiber hubs and the like. The base 54 may have any of a variety of shapes that is suitable for housing fiber optic hardware and for routing optical fibers of the stub cable 70, as described above. However, by way of example only, the base 54 may be elongated in the lengthwise direction relative to the widthwise direction between the opposed end walls 90, 92. Alternatively, the base 54 may be elongated in the widthwise direction relative to the lengthwise direction.

The stub cable port 82 is disposed medially, and as shown approximately centrally, through the end wall 90 of the base 54 and operable for receiving a stub cable assembly 104 comprising the stub cable 70. The stub cable assembly 104 is inserted through the stub cable port 82 of the connection terminal 50. The end of the stub cable 70 having pre-connectorized optical fibers mounted thereon is routed through the stub cable port 82 into the interior cavity of the connection terminal 50. As shown in FIG. 6, like the base 54, the cover 52 is generally rectangular and of a size slightly larger than the base 54 so that the peripheral sides of the cover 52 overlap the corresponding edges of the base 54. Additionally, although not shown in FIG. 6, the peripheral sides of the base 54 may overlap the cover 52.

When the seal 89 is provided to secure the cover 52 to the base 54, the resulting stiffness of the housing 56 is increased. As a result, the housing 56 may shatter under the same impact load conditions that would not shatter the cover 52 and base 54 without the inclusion of the seal 89. The cover 52 and base 54 could be made from materials that have greater impact resistance to offset the increased stiffness that results from providing the seal 89 otherwise, but at a higher cost. Providing one or more impact resistant joints disposed in the housing of a fiber optic enclosure allows the fiber optic enclosure to be more impact resistant even with the presence of a seal between a cover and base of the fiber optic enclosure. In this regard, embodiments disclosed herein provide at least one expandable joint disposed in the housing of a fiber optic enclosure, which is configured to absorb an impact load applied to the housing and deflect or contribute to deflection of an impact load applied to the housing.

In this regard, FIG. 7A illustrates a bottom view of the connection terminal 50 in FIGS. 5 and 6 that includes an expandable joint 110 disposed in the cover 52. The expandable joint 110 may be a hinge. The expandable joint 110 in this embodiment is comprised of an opening 112 in the cover 52 to break the continuity of the molded cover 52 and thus decrease the stiffness of the housing 56. The opening 112 in this embodiment of the connection terminal 50 is comprised of a void in material of the cover 52. The opening 112 is elongated along a longitudinal axis $A_2$ in this embodiment, as illustrated in FIG. 7A. The expandable joint 110 increases deflection 114 of the housing 56 in response to a compressive impact load 116, as illustrated in FIG. 7B, and thus is designed to present shattering of the housing 56 when made more rigid due to the inclusion of the seal 89 between the cover 52 and the base 54, as illustrated in FIG. 6. FIG. 8A illustrates a side perspective view of the connection terminal 50 of FIG. 7A. FIG. 8B illustrates how the connection terminal 50 of FIG. 7A can absorb and deflect or assist in absorbing and deflecting shear and torsional impact loads 118, 120 applied to the housing 56 of the connection terminal 50.

Figure 9:
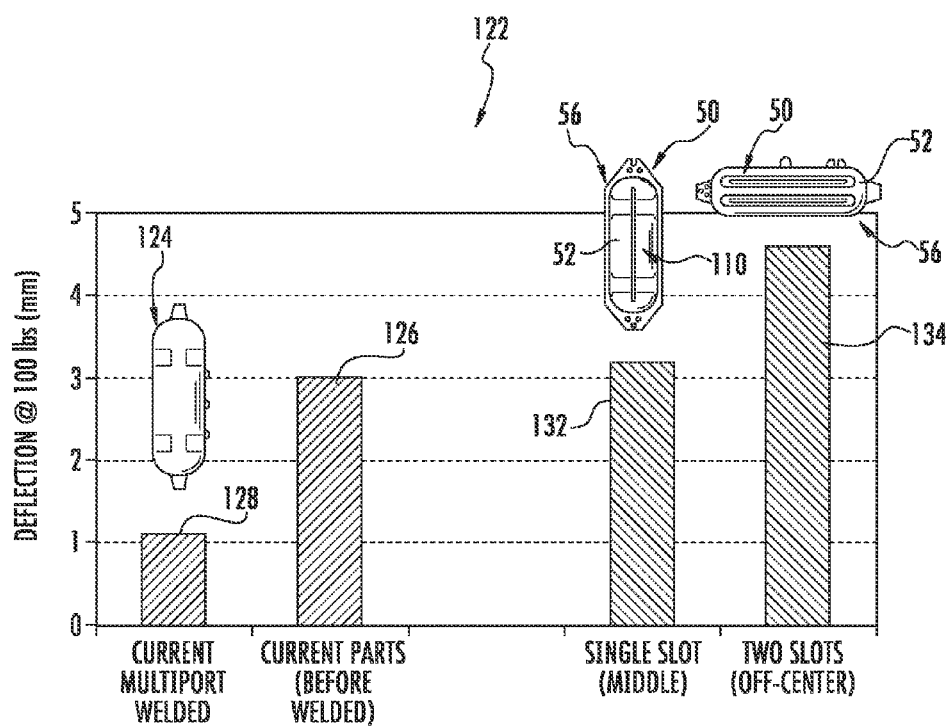
FIG. 9 is a chart illustrating the relative deflection characteristics between the multi-port optical connection terminal of FIG. 7A without an expandable joint and the multi-port optical connection terminal of FIG. 7A including the expandable joint.

FIG. 9 is a chart 122 illustrating the relative deflection characteristics between a connection terminal 124 that is like the connection terminal 50 of FIGS. 6-8B that does not include the expandable joint 110, and the connection terminal 50 that includes the expandable joint 110 to illustrate the differences in deflection characteristics. As illustrated in chart 122, the amount of deflection by the individual components (e.g., a cover and base) of the connection terminal 124, before a seal, such as a weld, is applied to attach these components together to form a housing, and before the connection terminal 124 will shatter is shown in bar 126. For example, the deflection shown in the chart 122 may be in units of ft./lbs., and may for example, be in units of hundred (100) ft./lbs. When a seal, such as a weld, is provided to securely attach the components of the housing of the connection terminal 124, the ability of the connection terminal 124 to absorb and deflect or assist in deflecting an impact load before the connection terminal 124 shatters under the load is reduced as shown in bar 128.

Figure 10:
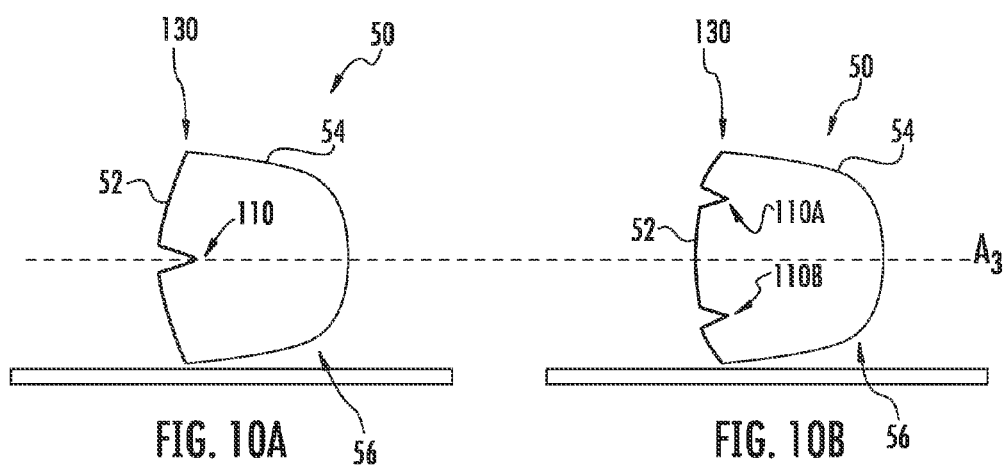
FIGS. 10A and 10B illustrate an impact load applied to a multi-port optical connection terminal fiber optic enclosure containing a single expandable joint versus a fiber optic enclosure including two expandable joints.

However, when a single expandable joint 110 is disposed in the cover 52 of the connection terminal 50 as illustrated in chart 122, the ability of the connection terminal 50 to absorb and deflect or assist in deflecting an impact load, such as an impact load 130 in FIG. 10A, before shattering increases as shown in bar 132 in FIG. 9. The ability of the connection terminal 50 to absorb and deflect or assist in deflecting an impact load, such as the impact load 130 in FIG. 10B, increases further when two expandable joints 110A, 110B are disposed in the cover 52 as shown in bar 134. As illustrated in FIG. 10B, the two expandable joints 110A, 110B in this example are disposed off-center of a longitudinal axis $A_3$ of the cover 52.

Figure 11:
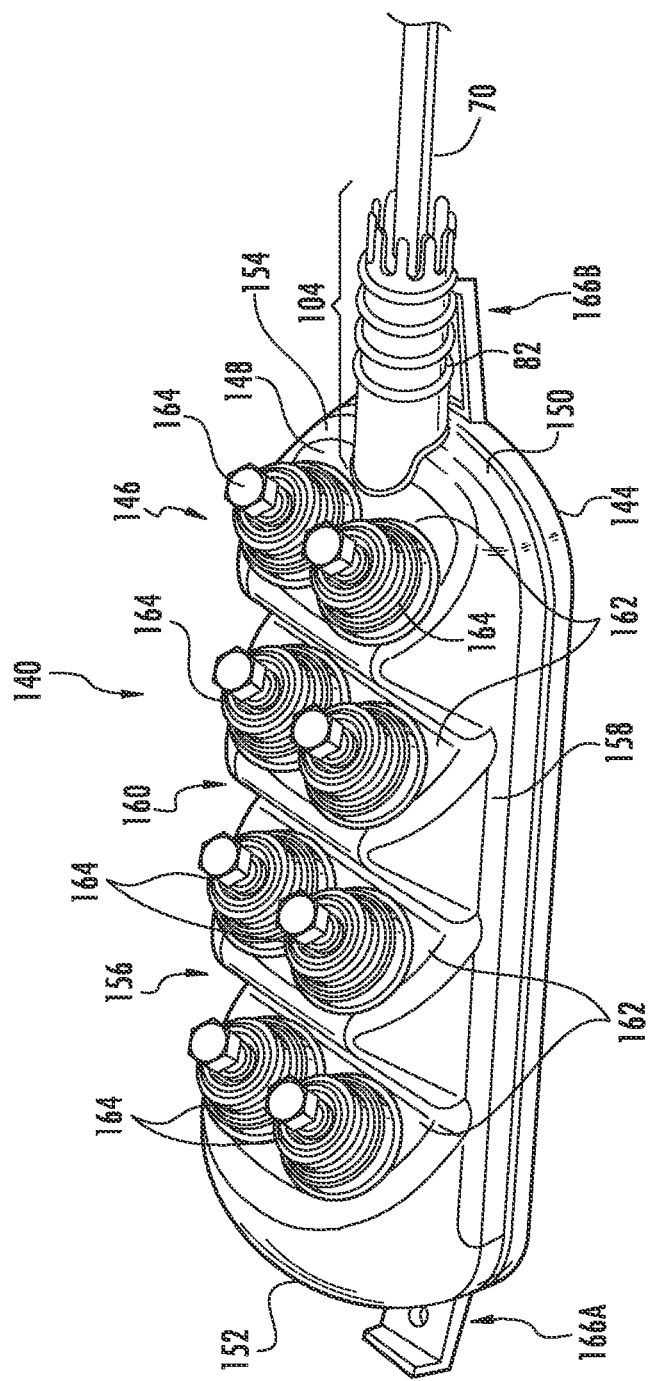
FIG. 11 illustrates a top perspective view of another exemplary multi-port optical connection terminal fiber optic enclosure that includes expandable joints.
Figure 2A:
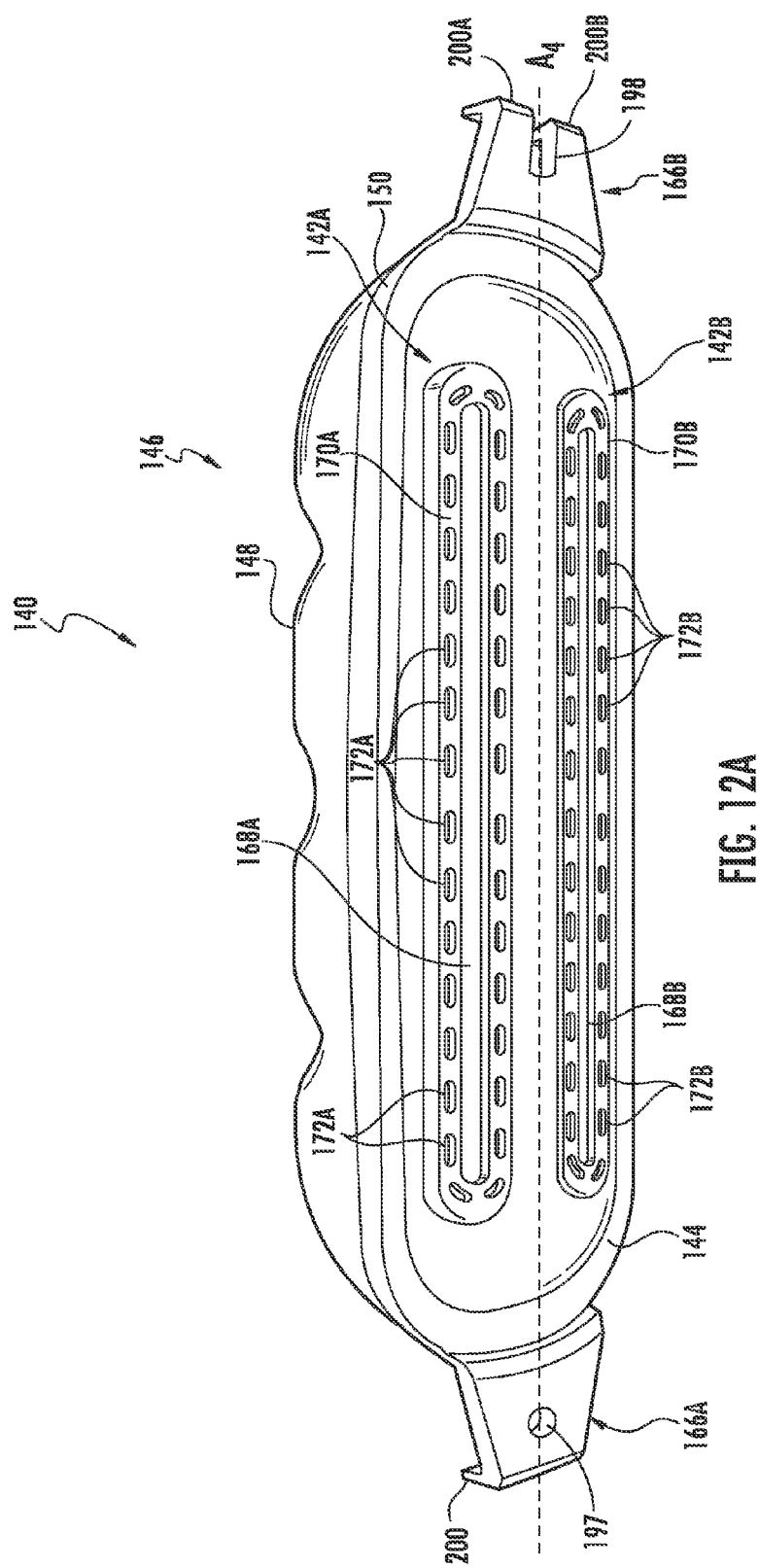

FIG. 11 illustrates a top perspective view of another exemplary multi-port optical connection terminal fiber optic enclosure 140 (also referred to as "connection terminal 140") similar to the connection terminal 50 of FIGS. 6-8B. However, the connection terminal 140 includes two off-center expandable joints 142A, 142B in a cover 144, as illustrated in FIGS. 12A and 12B. As an example, the cover 144 may be a molded piece. Before discussing the expandable joints 142A, 142B, with reference to FIG. 11, the connection terminal 140 may contain other features that are the same as or similar to the connection terminal 50 in FIGS. 6-8B. In this regard, the connection terminal 140 may comprise a housing 146 comprised of a base 148 and the cover 144. A seal 150 is disposed between the cover 144 and the base 148 to secure the cover 144 to the base 148. The base 148 has opposed end walls 152, 154, respectively, and side walls 156, 158, respectively. The base 148 is further provided with an upper surface 160. The upper surface 160 of the base 148 is provided with a plurality of angled or sloped surfaces 162. Each angled surface 162 has at least one connector port 164 formed therethrough. Mounting tab structural elements 166A, 166B (also referred to herein as "mounting tabs 166A, 166B") may be attached or provided as an integral to the base 148 or the cover 144 to allow the connection terminal 140 to be mounted to a surface. The mounting tabs 166A, 166B may be configured such that when disposed on a surface, the cover 144 is raised off of the surface. Further, the base 148 is box-shaped in this embodiment and defines an interior cavity (not shown) for housing fiber optic hardware, such as connector ports, adapters, optical fiber routing guides, fiber hubs and the like. The base 148 may have any of a variety of shapes that is suitable for housing fiber optic hardware and for routing optical fibers of the stub cable. However, by way of example only, the base 148 may be elongated in the lengthwise direction relative to the widthwise direction between the opposed end walls 152, 154. Alternatively, the base 148 may be elongated in the widthwise direction relative to the lengthwise direction.

FIG. 12A illustrates a bottom perspective view of the connection terminal 140 of FIG. 11 with the two expandable joints 142A, 142B disposed in the cover 144. FIG. 12B illustrates a close-up view of the two expandable joints 142A, 142B illustrated in FIG. 12A disposed in the cover 144 of the connection terminal 140 of FIG. 11. Providing two expandable joints 142A, 142B may increase the impact resistance of the connection terminal 140. Since the expandable joints 142A, 142B are disposed on both sides of the cover 144 in this embodiment, the stiffness of the expandable joints 142A, 142B is inversely proportional to the depth of the expandable joints 142A, 142B. The more shallow the expandable joints 142A, 142B, the greater the deformation, thus causing a delay in changing directions from absorption to deflection in response to an impact load. This increase in time is an indication of a more impact resistant design.

As illustrated in FIG. 12A, the expandable joints 142A, 142B are disposed off of a center longitudinal axis $A_4$ of the cover 144 as illustrated in FIGS. 12A and 12B. The expandable joints 142A, 142B may be hinges. The expandable joints 142A, 142B in this embodiment are comprised of openings 168A, 168B disposed in the cover 144. The openings 168A, 168B in this embodiment of the connection terminal 140 are comprised of voids in material of the cover 144. The openings 168A, 168B are elongated along and offset from the longitudinal axis $A_4$ in this embodiment, as illustrated in FIGS. 12A and 12B. The openings 168A, 168B are disposed parallel to each other in the direction of the longitudinal axis $A_4$. The expandable joints 142A, 142B enable an increase in the amount of deflection of the housing 146 in response to a compressive impact load, and thus are designed to prevent shattering of the housing 146 when made more rigid due to the inclusion of the seal 150 between the cover 144 and the base 148, as illustrated in FIG. 12A.

Figure 13:
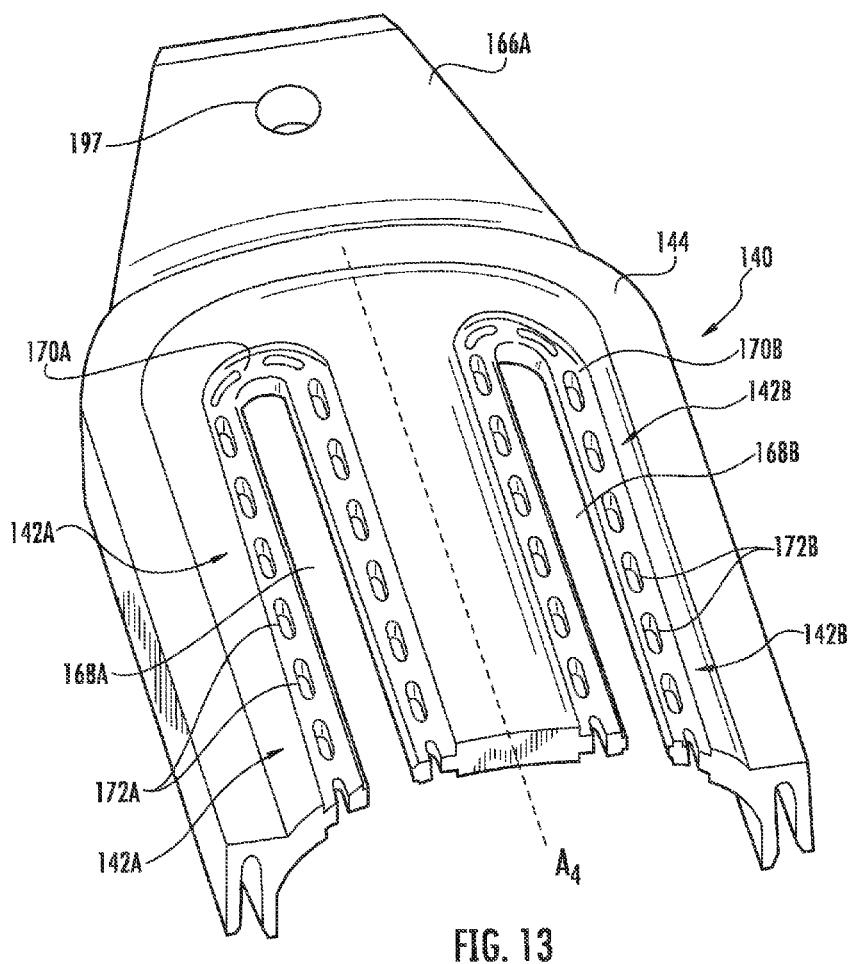
FIG. 13 illustrates a perspective cross-sectional view of the cover of the multi-port optical connection terminal of FIG. 11 and the two expandable joints disposed therein.
Figure 15:
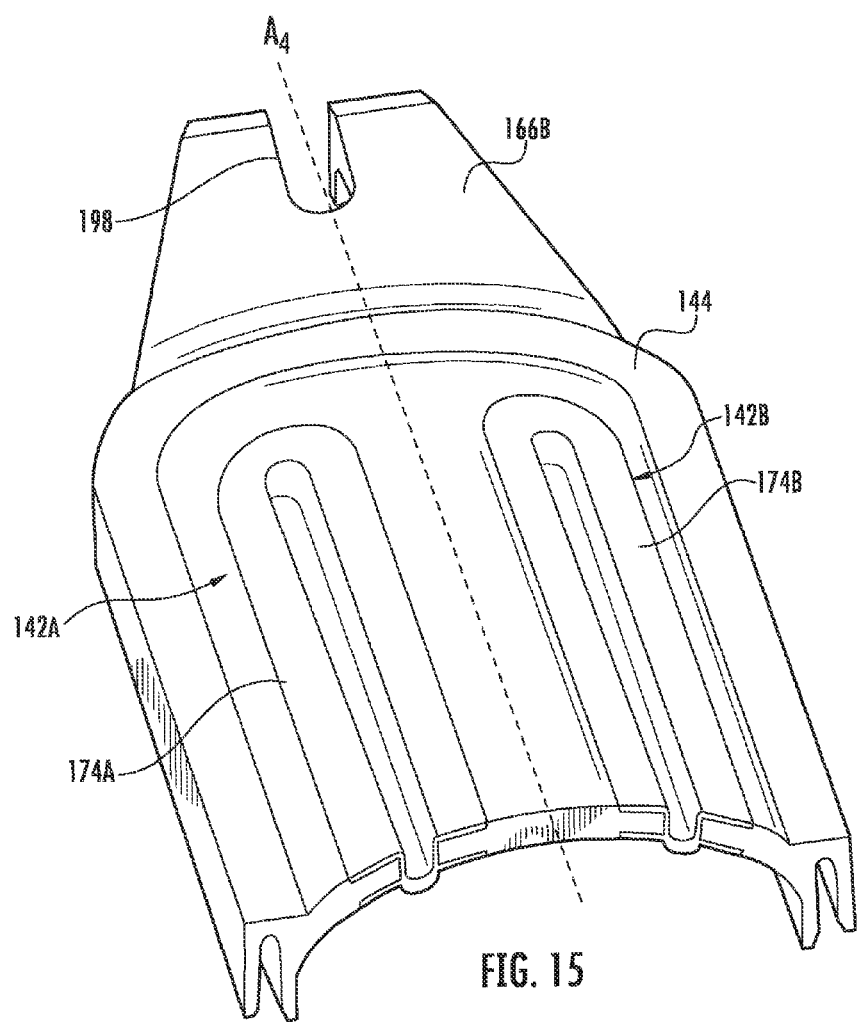
FIG. 15 illustrates a perspective cross-sectional view of the cover of the multi-port optical connection terminal of FIG. 14A and the two overmolded expandable joints disposed therein.

As illustrated in FIGS. 12A and 12B, and the perspective cross-sectional view of the cover 144 of the connection terminal 140 in FIG. 13, the openings 168A, 168B each comprise a recessed area 170A, 170B comprised of a plurality of optional openings 172A, 172B in this embodiment. The recessed areas 170A, 170B are configured to receive an overmolding material to seal the openings 172A, 172B if desired to be provided. The optional openings 172A, 172B can be provided to allow an overmolding material disposed in the openings 168A, 168B to penetrate therethrough to provide a more secure bonding of the overmolding material to the openings 168A, 168B to seal off the openings 168A, 168B. Providing the overmolding material to the openings 168A, 168B may also serve to increase the deflection characteristics of the connection terminal 140. In this regard, FIG. 14A illustrates a bottom perspective view of the connection terminal 140 of FIGS. 12A-13, but with an overmolding material 174A, 174B provided in the openings 168A, 168B of the expandable joints 142A, 142B. FIG. 14B illustrates a close-up view of the two overmolded expandable joints 142A, 142B illustrated in FIG. 14A disposed in the cover 144 of the connection terminal 140. Additionally, as shown in FIG. 12A, the overmolding material may be disposed to provide an extension 200 with either a continuous surface or an interrupted surface 200A, 200B. In FIG. 12A, the extension 200 with a continuous surface is shown on mounting tab 166A and with the interrupted surface 200A, 200B on mounting tab 166B. This will be discussed further with reference to FIGS. 17A and 17B, below. FIG. 15 illustrates a perspective cross-sectional view of the cover 144 of the connection terminal 140 of FIGS. 14A and 14B showing the two overmolded expandable joints 142A, 142B disposed in the cover 144.

FIG. 16 is a chart 180 illustrating the relative deflection characteristics between different fiber optic enclosures disclosed herein to show the performance of providing one or more expandable joints in the housing of the fiber optic enclosures. Column 182 provides the fiber optic enclosure. As previously discussed, the connection terminal 124 from FIG. 9 contains no expandable joints. The connection terminal 140 with the openings 168A, 168B were considered into two different design versions, as illustrated in the design version column 184. The overmolding material 174A, 174B disposed in the openings 168A, 168B was also considered as shown in column 182. In this regard, column 186 shows exemplary time intervals from impact to maximum deflection in response to an exemplary impact load. A longer time interval from impact to maximum indicates an increased ability to absorb and deflect an impact load. Note that even with the addition of the overmolding material 174A, 174B to seal the openings 168A, 168B, the time interval from impact to maximum deflection is greater than that of the connection terminal 124 which does not include expandable joints. The maximum deflections are shown in column 188.

Figure 17A:
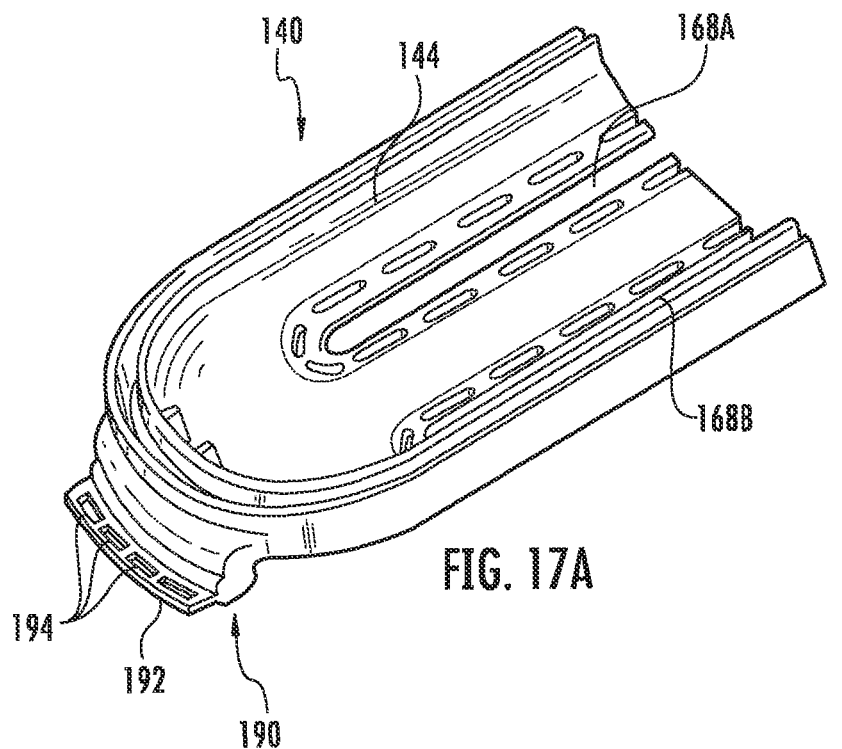
FIGS. 17A and FIG. 17B are perspective views of the cover of the fiber optic enclosure multi-port optical connection terminal of FIG. 12A without and with shear and/or torsional load impact resistant mounting tab structural elements, respectively, for mounting the multi-port optical connection terminal.
Figure 17B:
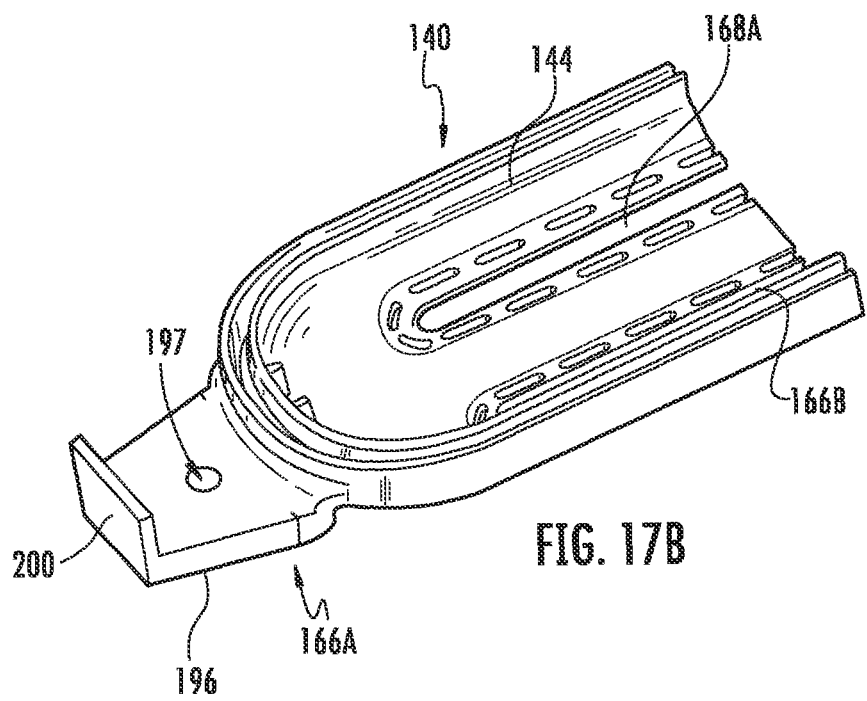
Figure 18A:
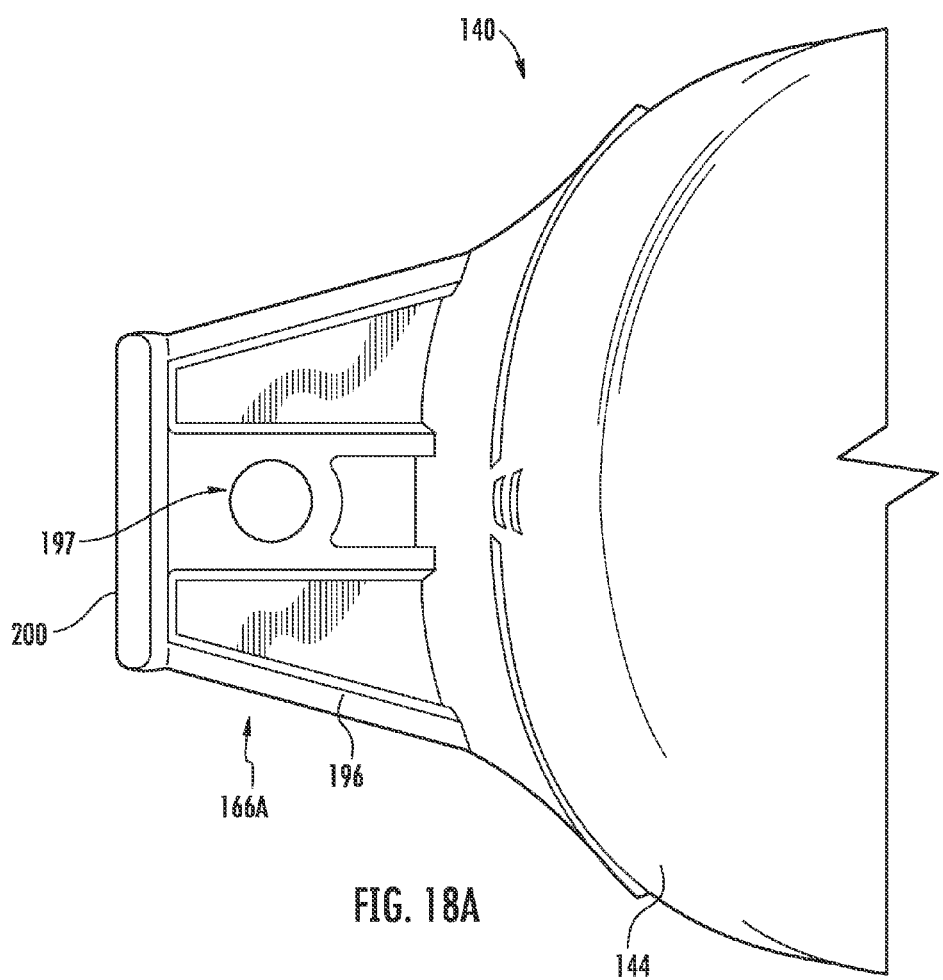

Because the mounting tabs 166A, 166B previously illustrated for the connection terminal 140 are disposed such that the cover 144 is raised off a mounting surface, the mounting tabs 166A, 166B will also absorb some of the impact load, especially a shear and torsional impact load applied to the connection terminal 140. Thus, it may be desired to provide for the mounting tabs 166A, 166B to be impact resistant as well in addition to the cover 144 and housing 146 of the connection terminal 140. In this regard, FIGS. 17A and FIG. 17B are perspective views of the cover 144 of the connection terminal 140 of FIG. 12A without and with shear and/or torsional load impact resistant mounting tabs 166A, respectively. FIGS. 18A and 18B are top and side views, respectively, of the shear and/or torsional load impact resistant mounting tabs 166A in FIG. 17B. As illustrated in FIG. 17A, the cover 144 includes a mounting extension 190 that includes a platform 192 containing a plurality of openings 194. The platform 192 is configured to receive an overmolding material 196 to provide for an impact resistant mounting tab 166A, as illustrated in FIGS. 17B-18B. The openings 194, which are optional, may be provided to allow the overmolding material 196 to penetrate the openings 194 to provide a more secure attachment of the overmolding material 196 to the mounting extension 190 in FIG. 17A.

The overmolding material 196 may be disposed on the mounting extension 190 such that an opening or hole 197 or a slot 198 is provided to allow a mounting fastener, such as a nail or screw, to be disposed therein to mount the connection terminal 140. The hole 197 may be provided in mounting tab 166A. Since access to the hole 197 may be available, a fastener such as, without limitation, a screw, a nail or a bolt can be inserted through the hole 197 and tightened or otherwise manipulated using a tool, such as, without limitation a screw driver, hammer or drill. The slot 198 may be provided in mounting tab 166B since access may be reduced due to the stub cable assembly 104 and the mounting tab 166B may be positioned on the fastener without the need to tighten or otherwise manipulate it. The mounting tab 166B is not shown in FIGS. 17A and 17B. FIGS. 11, 12A, 14A and 15 illustrate the mounting tab 166B with slot 198. The overmolding material 196 may be disposed such that the extension 200 may be formed to provide a continuous surface around the hole 197 or slot 198 to retain the fastener. Alternatively, the overmolding material 196 may be disposed such that the interrupted surface 200A, 200B may be formed around the slot 198 (as shown in FIG. 12A) to allow it to be inserted over a fixed mounting feature such as a screw, nail or bolt fastener. The material used for the overmolding material 196 may be any overmolding material desired, including the same materials that may be used for the overmolding material 174A, 174B.

Referring now to FIGS. 18A and 18B, the shear and/or torsional load impact resistant mounting tab 166A is shown. The mounting tab 166A, and, although not shown, the mounting tab 166B, have a mounting strap receiver 202. A mounting strap (not shown) may be positioned on the mounting strap receiver 202 and used to mount the connection terminal 140 to a structure, such as for example a post.

Many modifications and other embodiments of the invention set forth herein will come to mind to one skilled in the art to which the invention pertains having the benefit of the teachings presented in the foregoing descriptions and the associated drawings. These modifications include, but are not limited to, type of fiber optic enclosure, the configuration of the components that provide the housing, such as a cover and base as examples, the type or shape of expandable joint(s), the number of expandable joints provided, the location of the disposition of the expandable joint(s) provided, and whether overmolding material is provided and the type of material(s).

The various embodiments of fiber optic enclosures disclosed herein may be applied in an optical "fiber-to-the-premises" (FTTP) network. As used herein and well known and understood in the art, the term "drop cable" is intended to include a fiber optic cable comprising a cable sheath or jacket surrounding at least one flexible transport tube containing one or more optical fibers. As used herein, the term "distribution cable" is intended to include both a main feeder cable, a distribution cable and a branch cable, and may be any type of fiber optic cable having a fiber count greater than that of the drop cable. In one example, the distribution cable may comprise at least one, and preferably, a plurality of flexible buffer tubes. The pre-connectorized drop cables may be readily connected to and disconnected from the connector ports of the multi-port optical connection terminal, thus eliminating the need for entering the multi-port terminal and splicing the optical fibers of the drop cables to optical fibers of a stub cable, as will be described.

The fiber optic drop cables may be optically connected to optical fibers of the communications network within a conventional outside plant closure, such as a local convergence cabinet (LCC), a pedestal, a network access point (NAP) closure, or a network interface device (NID) of the types available from Corning Cable Systems, LLC of Hickory, N.C. In the exemplary embodiments shown and described herein, the fiber optic cables extend from a NID located at a subscriber premises and are optically connected through the connector ports of the fiber optic enclosure to optical fibers in a network. The fiber optic enclosure may be provided at an aerial location, such as mounted to an aerial strand between telephone poles or mounted on a telephone pole, at a buried location, such as within a hand-hole or below grade vault, or at an above-ground location, such as within a cabinet, terminal, pedestal or above grade vault. In serving the foregoing function, a fiber optic enclosure constructed in accordance with the embodiments disclosed herein can facilitate the deployment of a FTTP communications network.

In facilitating the deployment of a fiber optic network, and in particular a FTTP communications network, the embodiments disclosed herein can function to permit a communications service provider to factory manufacture and assemble the multi-port optical connection terminal for connection to the optical network at factory-prepared or field-prepared midspan access locations along the length of the distribution cable. The fiber optic enclosures can provide an accessible interconnection terminal for readily connecting, disconnecting or reconfiguring drop cables in the optical network, and in particular, for interconnecting drop cables with a distribution cable. As used herein, the term "interconnecting" is intended to describe the connection of a drop cable to a distribution cable through the fiber optic enclosure.

Further, as used herein, it is intended that terms "fiber optic cables" and/or "optical fibers" include all types of single mode and multi-mode light waveguides, including one or more optical fibers that may be bare, upcoated, colored, buffered, tight-buffered, loose-tube, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

What is claimed is:

1. A fiber optic enclosure, comprising:
 a housing, comprising:
  a base;
  a cover; and
  a seal disposed between the cover and the base to secure the cover to the base and define an interior cavity configured to support one or more fiber optic components therein; and
  the housing having a stiffness resulting from the seal disposed between the cover and the base;
 at least one expandable joint comprised of at least one expandable opening disposed in the housing to decrease the stiffness of the housing, the at least one expandable opening configured to deflect or assist in deflecting an impact load applied to the housing.

2. The fiber optic enclosure of claim 1, wherein the at least one expandable opening is configured to deflect the impact load applied to the housing without the seal being broken.

3. The fiber optic enclosure of claim 1, wherein the at least one expandable opening is configured to withstand an increasing compressive pressure applied to the housing without the seal being broken.

4. The fiber optic enclosure of claim 1, wherein the at least one expandable opening is configured to deflect the impact load applied to the housing without the cover being separated from any portion of the base.

5. The fiber optic enclosure of claim 1, wherein the at least one expandable opening is configured to absorb at least one of a compressive impact load, a tensile impact load, a shear impact load, and a torsional impact load.

6. The fiber optic enclosure of claim 1, wherein the at least one expandable opening is disposed through an exterior wall of the housing.

7. The fiber optic enclosure of claim 1, wherein the at least one expandable opening is comprised of at least one expandable hinge.

8. The fiber optic enclosure of claim 1, wherein the at least one expandable opening is disposed in the base.

9. The fiber optic enclosure of claim 1, wherein the at least one expandable opening is disposed in the cover.

10. The fiber optic enclosure of claim 1, wherein the at least one expandable opening is disposed in the cover in a longitudinal direction of the cover.

11. The fiber optic enclosure of claim 1, wherein a longitudinal axis of the least one expandable opening is disposed equal-distant from at least two ends of the cover.

12. The fiber optic enclosure of claim 1, wherein the at least one expandable opening is comprised of two elongated expandable openings each disposed in the cover and each having a longitudinal axis disposed parallel to each other extending in a longitudinal direction of the cover.

13. The fiber optic enclosure of claim 12, wherein longitudinal axes of the two elongated expandable openings are disposed the same distance from their respective adjacent ends of the cover.

14. The fiber optic enclosure of claim 12, wherein the at least one overmolding material is comprised of at least one of santoprene, kraton, evoprene, silicone rubber, an elastomeric material, and a flexible material.

15. The fiber optic enclosure of claim 12, wherein the at least one overmolding material has a modulus of elasticity between 1,000 pounds per square inch (psi) and 300,000 psi.

16. The fiber optic enclosure of claim 15, wherein the at least one mounting tab is comprised of at least one overmolding material.

17. The fiber optic enclosure of claim 16, wherein the at least one mounting tab is comprised of at least one recessed area to receive the at least one overmolding material.

18. The fiber optic enclosure of claim 17, wherein the at least one recessed area comprises at least one opening configured to receive a portion of the at least one overmolding material.

19. The fiber optic enclosure of claim 1, wherein the at least one expandable opening is overmolded with at least one overmolding material.

20. The fiber optic enclosure of claim 1, wherein the at least one expandable joint further comprises of at least one recessed area to receive the at least one overmolding material.

21. The fiber optic enclosure of claim 20, wherein the at least one recessed area comprises at least one opening configured to receive a portion of the at least one overmolding material.

22. The fiber optic enclosure of claim 1, wherein the housing further comprises at least one mounting tab.

23. The fiber optic enclosure of claim 22, wherein the least one mounting tab is configured to deflect an impact load to the housing.

24. The fiber optic enclosure of claim 1, wherein the impact load is comprised of at least 10 ft-lbs.

25. The fiber optic enclosure of claim 1, wherein the impact load is comprised of at least 10 ft-lbs. at an environmental temperature of −20 degrees Celsius or less.

26. The fiber optic enclosure of claim 1 configured as a multi-port optical connection terminal, a terminal for terminated ends of fiber optic cables, a local convergence point (LCP), a fiber distribution terminal (FDT) a splice closure, a fiber interconnection closure, a canister-type fiber optic closures, and a network interface device (NID) closure.

27. The fiber optic enclosure of claim 1, wherein the housing defines a shape comprised from the group consisting of a spherical shape, a box shape, a trapezoidal shape, and an elliptical shape.

28. The fiber optic enclosure of claim 1, wherein the cover comprises a plurality of covers, and wherein a seal is disposed between each of the plurality of covers and the base.

29. An optical connection terminal for use at a branch point in a fiber optic communications network, comprising:
a housing, comprising:
a base;
a cover;
a seal disposed between the cover and the base to attach the cover to the base and define an interior cavity configured to support one or more fiber optic components therein;
the housing having a stiffness resulting from the seal disposed between the cover and the base;
a stub cable port provided in one of the base and the cover through an exterior wall; and
a plurality of connector ports provided in the exterior wall of one of the base and the cover, each connector port extending through the exterior wall and configured to receive one of a plurality of fiber optic connectors disposed within the interior cavity; and
at least one expandable hinge comprised of at least one expandable opening disposed through the exterior wall of at least one of the cover and the base to decrease the stiffness of the housing, the at least one expandable opening configured to deflect or assist in deflecting an impact load applied to the housing.

30. The optical connection terminal of claim 29, wherein the at least one expandable opening is disposed in a longitudinal direction of the at least one of the cover and the base.

31. The optical connection terminal of claim 29, wherein a longitudinal axis of the least one expandable opening is disposed equal-distant from at least two ends of the at least one of the cover and the base.

32. The optical connection terminal of claim 29, wherein the at least one expandable opening is comprised of two elongated expandable openings each disposed in the at least one of the cover and the base and each having a longitudinal axis disposed parallel to each other extending in a longitudinal direction of the at least one of the cover and the base.

33. The optical connection terminal of claim 32, wherein longitudinal axes of the two elongated expandable openings are disposed the same distance from their respective adjacent ends of the at least one of the cover and the base.

34. The optical connection terminal of claim 29, wherein the at least one expandable opening is overmolded with at least one overmolding material.

35. The optical connection terminal of claim 29, wherein the at least one expandable opening is further comprised of at least one recessed area to receive the at least one overmolding material.

36. The optical connection terminal of claim 35, wherein the at least one recessed area comprises at least one opening configured to receive a portion of the at least one overmolding material.

37. The optical connection terminal of claim 29, wherein the housing further comprises at least one mounting tab comprised of at least one overmolding material.

38. A method of assembling a fiber optic enclosure, comprising:
   providing a base;
   providing a cover;
   attaching the cover to the base to define an interior cavity configured to support one or more fiber optic components therein;
   disposing a seal between the cover and the base to secure the cover to the base to provide housing of a stiffness; and
   providing at least one expandable opening in at least one of the base and the cover to decrease the stiffness of the housing, the at least one expandable opening configured to deflect or assist in deflecting an impact load applied to the housing.

39. The method of claim 38, wherein the at least one expandable opening is comprised of an opening disposed through an exterior wall of the housing.

40. The method of claim 38, wherein providing the base comprises providing the base that includes the at least one expandable opening.

41. The method of claim 38, wherein providing the cover comprises providing the cover that includes the at least one expandable opening.

42. The method of claim 38, wherein the at least one expandable opening is overmolded with at least one overmolding material.

43. The method of claim 38, further comprising providing at least one mounting tab attached to one of the cover or the base.

44. The method of claim 43, wherein the at least one mounting tab is comprised of at least one overmolding material.

* * * * *